(12) United States Patent
Kettler

(10) Patent No.: US 10,107,685 B2
(45) Date of Patent: Oct. 23, 2018

(54) METHOD FOR GENERATING AND APPLYING INSTRUMENT PROFILES

(75) Inventor: Wilhelm Kettler, Wuppertal (DE)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 1572 days.

(21) Appl. No.: 12/954,996

(22) Filed: Nov. 29, 2010

(65) Prior Publication Data

US 2011/0143017 A1   Jun. 16, 2011

Related U.S. Application Data

(60) Provisional application No. 61/285,569, filed on Dec. 11, 2009.

(51) Int. Cl.
*B05D 5/06* (2006.01)
*G01J 3/28* (2006.01)
*G01J 3/50* (2006.01)

(52) U.S. Cl.
CPC ............ *G01J 3/28* (2013.01); *G01J 3/504* (2013.01)

(58) Field of Classification Search
CPC .................................. G01J 3/28; G01J 3/504
USPC ................................................. 427/160–169
See application file for complete search history.

(56) References Cited

U.S. PATENT DOCUMENTS

| 7,262,855 B2 | 8/2007 | Van Andel et al. |
| 2003/0223060 A1* | 12/2003 | Graf ..................... G01J 3/0251 |
| | | 356/319 |

FOREIGN PATENT DOCUMENTS

| CN | 201000365 Y | 1/2008 | |
| DE | 102008010562 A1 * | 9/2009 | ........... G01J 3/46 |

OTHER PUBLICATIONS

ISA European Patent Office, International Search Report and Written Opinion for International Application No. PCT/US2010/058167, dated Jun. 21, 2011.
ISA European Patent Office, International Preliminary Report on Patentability for International Application No. PCT/US2010/058167, dated Mar. 10, 2011.
Mexican Intellectual Property Office, Mexican Office Action for Application No. MX/a/2012/006489 dated Oct. 17, 2013.
SIPO Chinese Office Action for Application No. 201080055744.3, dated Mar. 5, 2014.
Mexican Intellectual Property Office, Mexican Office Action for Application No. MX/a/2012/006489 dated Apr. 29, 2014.
(Continued)

*Primary Examiner* — Michael P Wieczorek
*Assistant Examiner* — Michael G Miller
(74) *Attorney, Agent, or Firm* — Lorenz & Kopf, LLP

(57) ABSTRACT

The invention relates to a method for generating calibrated color data of a target using color measurement instruments distributed in the network comprising the steps A) generating at least one standard instrument profile for the color measurement instruments distributed in the network to correct photometric and wavelength scale differences, and B) generating at least one geometry instrument profile for the color measurement instruments distributed in the network to correct geometry scale differences. The method can be used in applications where color measurement instrument networks are used, particularly in robotic systems where color measurement instruments are integrated.

9 Claims, 24 Drawing Sheets

(56) References Cited

OTHER PUBLICATIONS

Ingleson, A. et al. "Methods of Selecting a Small Reflectance Set as a Transfer Standard for Correcting Spectrophotometers," COLOR research and application conference paper, Feb. 2006, pp. 13-16, vol. 31, No. 1.
Liu, J. et al. "Design and characterization of a versatile reference instrument for rapid, reproducible specular gloss measurements," Applied Optics, vol. 44, Issue 22.
Pointer, M. et al. "A new goniospectrophotometer for measuring gonio-apparent materials," Coloration Technology, Mar. 2005, vol. 121, Issue 2.
IMPI, Mexican Office Action MX Application No. MX/a/2012/006489, dated Nov. 14, 2014.
CIPO, Office Action for Canadian Application No. 2,781,121, dated Sep. 10, 2014.

\* cited by examiner

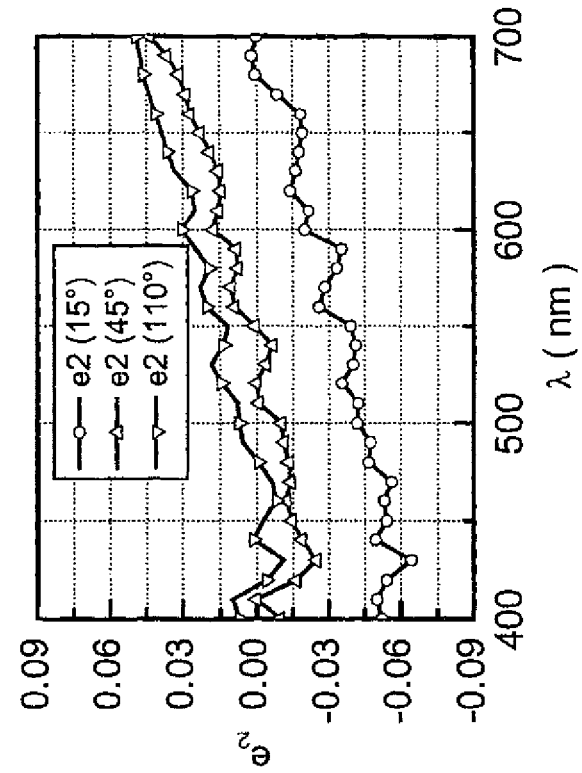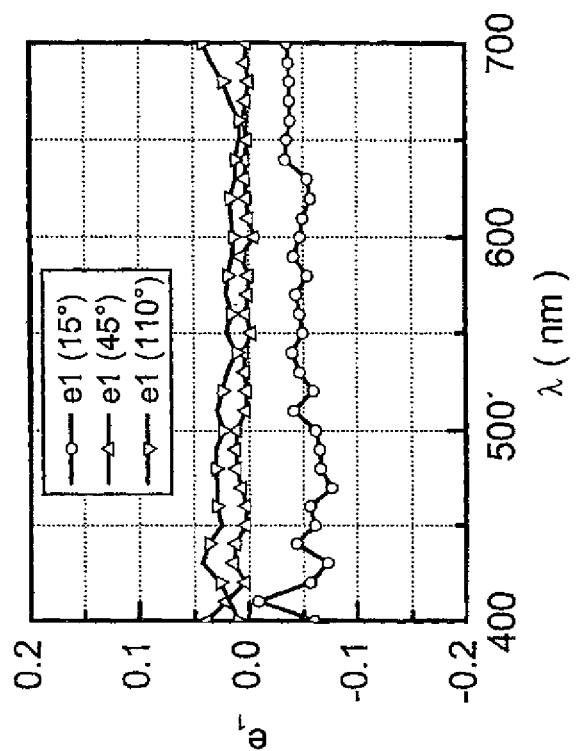
FIG. 3A
FIG. 3B

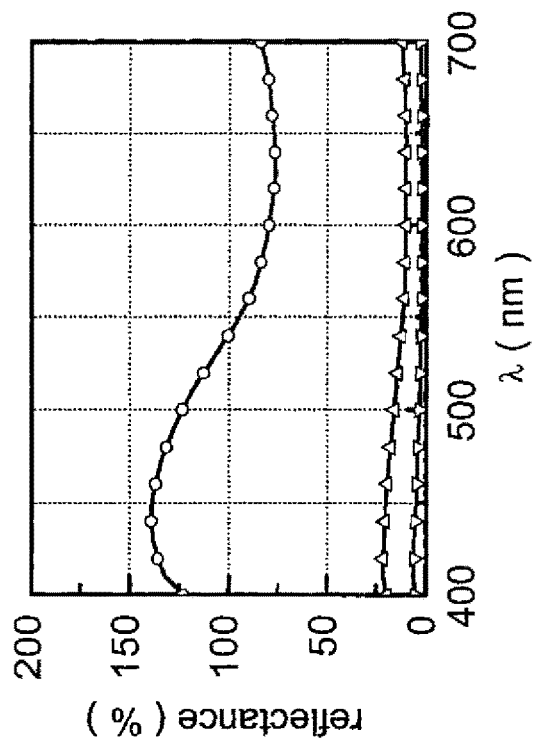
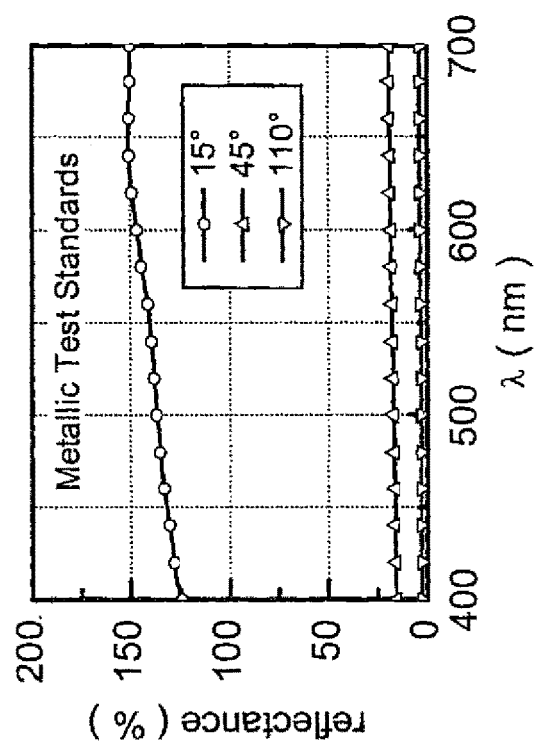
FIG. 6A
FIG. 6B

METHOD FOR GENERATING AND APPLYING INSTRUMENT PROFILES

FIELD OF INVENTION

The invention relates to a method for generating calibrated colour data of a target using colour measurement instruments distributed in a network. The method has applications in all fields where colour measurement instrument networks are used, e.g. where colour measurement instruments are integrated in robotic systems.

BACKGROUND OF INVENTION

For a series of applications as, e.g., the instrumentally aided repair of surface coatings defects in body shops or recipe calculation in colouristic laboratories base, data have to be generated on a reference system/instrument, to which subsequently all systems/instruments in a distributed network of colour measurement instruments do have access to. The measurement technology utilised in a network can be homogeneous (systems of equal type) or heterogeneous (systems of different type). The latter is probable in applications, where databases have to be maintained across generations of instruments. In such cases the transferability of absolute colour coordinates is a condition precedent to efficiently support the respective process by the associated application. However, various random, systematic, and coarse error sources limit the attainable performance of an application.

For the analysis of random errors efficient statistical tools have been developed and can be utilised to successfully analyse experimental data.

Coarse errors result from carelessness as, e.g., flawed readings of an instrument display. They are not subject to considerations of an error theory, but they can often be identified as so-called outliers in a sample, being markedly different from all other measurement results.

In experiments, systematic errors can occur with certain regularity and can be constant or vary in a predictive fashion. Causes of the systematic errors can be of instrumental or personal origin and may not be easy to detect. Statistical analyses of such systematic errors in general may not be meaningful. Some reproducible systematic errors can be traced back to one or more flawed calibrations or the bias of an observer. These errors have to be estimated by means of a thorough analysis of experimental conditions and techniques. In some cases, where type and extent of errors are known, corrections to experimental data can be performed to compensate systematic errors. For some errors associated with instrument scales such as the photometric scale defined by the instrument calibration, or the wavelength and angle scales defined by the instrument manufacturer, physically motivated correction models have been constructed.

An error model must be generally applicable across all modern instrument configurations and measurement geometries. A fundamental model is required to efficiently correct systematic errors in spectrophotometric measurements associated with all instrument scales: photometric scale, wavelength scale, and angle scale. Sound physical models can be derived leading to spectral differences between instruments, which can be used to predict systematic errors.

However, physically meaningful error models have been introduced, for example, by Robertson to correct photometric and wavelength scales only (A. R. Robertson, *Diagnostic performance evaluation of spectrophotometers*, in Advances in Standards and Metrology in Spectrophotometry, ed. by C. Burgess and K. D. Mielenz, p. 277, Elsevier Science Publishers B. V., Amsterdam (1987)). These models have been generalised and extended to improve their performance and efficiency. Models for correcting errors of the angle scale of goniospectrophotometers have not been published so far.

In practical applications differences in geometrical measurement conditions may occur, where colour measurement instruments are slightly tilted by the operator during the measurement process, or where those instruments are mounted in a measurement robot used in an application where contact-free measurements have to be carried out. In both cases tilted measurement plane will have the biggest impact on readings of angles close to the specular. Typically this is an angle as close as 15° to the gloss angle. When measuring brilliant metallic colour shades a misalignment of the measurement plane of only 0.1° might be sufficient to give rise to an out-of-specification situation.

SUMMARY OF THE INVENTION

The objective of the present invention is to provide a method which is to correct measurement results obtained for a tilted measurement geometry and also to include differences in apertures. Also, the objective was to improve data consistency between the colour readings of colour measurement instruments integrated in a network or robotic systems, i.e. to improve the accuracy of colour measurement within a network of distributed colour measurement instruments and to ensure comparability of measurement results obtained at different gonioapparent colour measurement instruments within the network.

The present invention describes a method for generating instrument profiles for a network of distributed colour measurement instruments, in particular spectrophotometers, and applying those instrument profiles, combining photometric and wavelength scale corrections and geometry scale corrections, i.e. corrections of differences in geometric measurement conditions.

The present invention is directed to a method for generating calibrated colour data of a target using colour measurement instruments distributed in a network, said method comprising the steps of:

A) generating at least one standard instrument profile for the colour measurement instruments distributed in the network to correct photometric and wavelength scale differences, wherein step A) comprises:

A1) measuring a set of solid reflectance standards at least two measurement geometry configurations and at each of the colour measurement instruments distributed in the network to obtain solid standard reflectance spectra of said solid reflectance standards, and A2) generating at least one standard instrument profile for each of the colour measurement instruments distributed in the network based on the solid standard reflectance spectra to correct photometric and wavelength scale differences; and B) generating at least one geometry instrument profile for the colour measurement instruments distributed in the network to correct geometry scale differences, wherein step B) comprises:

B1) measuring a set of gonioapparent reflectance standards at least two measurement geometry configurations and at each of the colour measurement instruments distributed in the network to obtain gonioapparent standard reflectance spectra, B2) applying the at least one standard instrument profile generated in step A) to the gonioapparent standard reflectance spectra obtained in step B1) to obtain profiled gonioapparent standard reflectance spectra, and B3) generating at least one geometry instrument profile for each of the colour measurement instruments distributed in the network to correct geometry scale differences based on said profiled gonioapparent standard reflectance spectra.

The method can further comprise the steps of:

C) generating the calibrated colour data of the target, said step C) comprises:

C1) obtaining target gonioapparent measurement data of the target using one or more of the colour measurement instruments distributed in the network;

C2) applying the at least one standard instrument profile generated in step A) to the target gonioapparent measurement data to generate photometric and wavelength scale corrected target measurement data, and C3) applying the at least one geometry instrument profile generated in step B) to the photometric and wavelength scale corrected target measurement data obtained in step C2) to generate said calibrated colour data of the target.

DETAILED DESCRIPTION

Figure 1B:
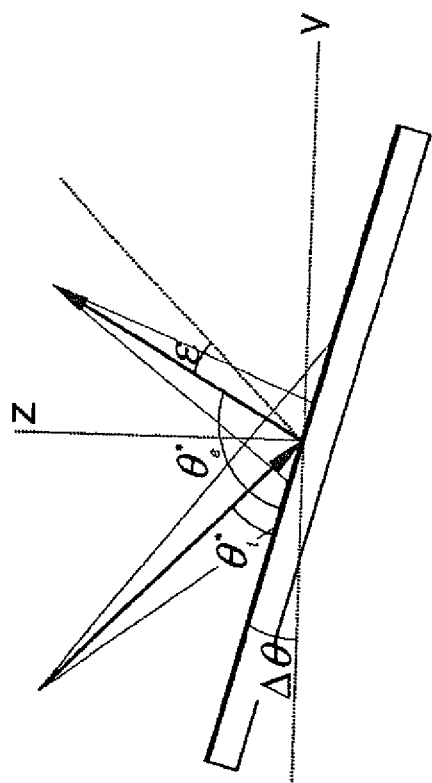
FIG. 1 is a schematic view of the measurement geometry for a reference colour measurement instrument (herein referred to as "master instrument") (FIGS. 1A, 1C, and 1E) and of tilted measurement geometries of a secondary colour measurement instrument (FIGS. 1B, 1D, and 1F).
Figure 1A:
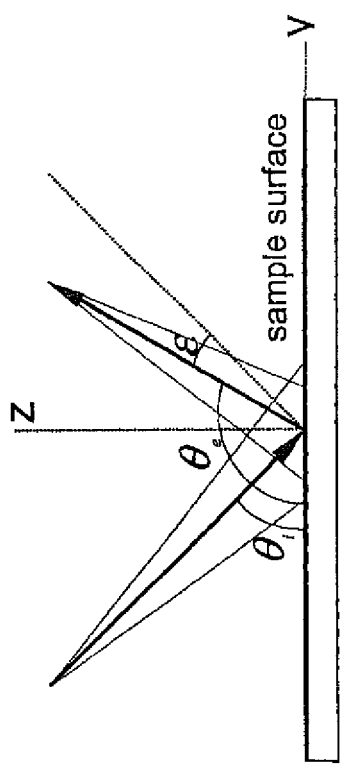
Figure 1C:
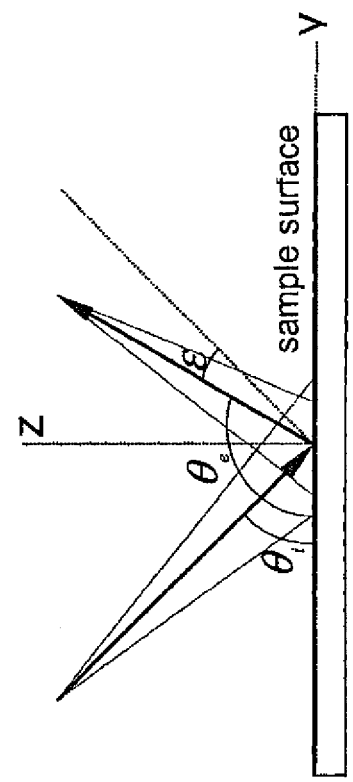
Figure 1D:
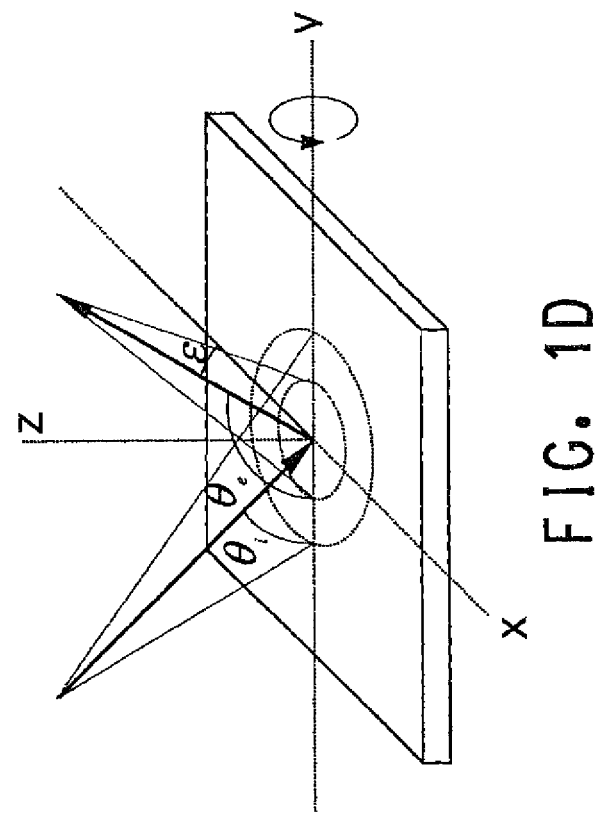
Figure 1E:
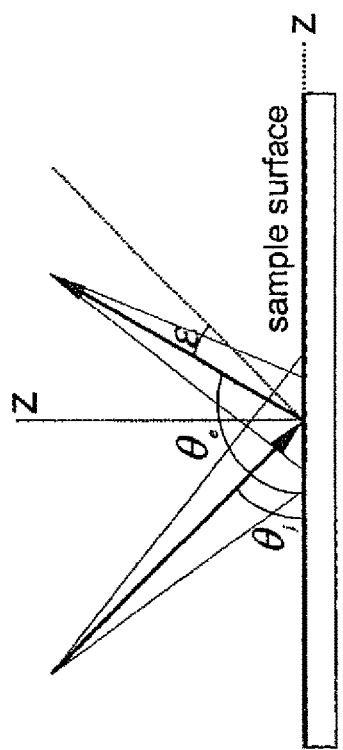
Figure 1F:
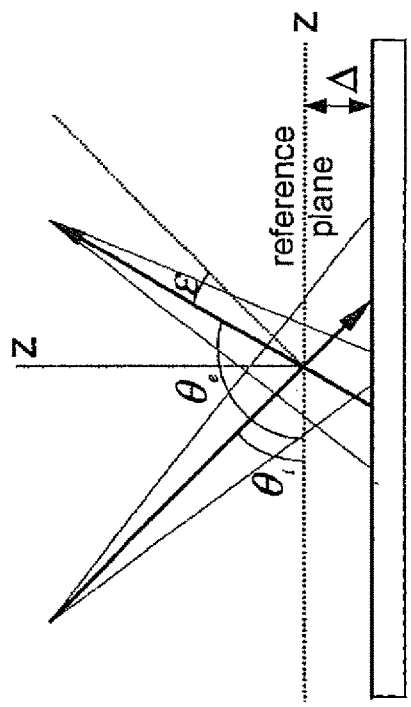

These and other features and advantages of the present invention will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

As used herein:

The term "reflectance spectrum" shall mean here and in the following the ratio of the radiant flux reflected in the directions delimited by a given cone to that reflected in the same directions by a perfect reflecting diffuser identically irradiated. The corresponding measurement quantity is called reflectance factor. If the cone of the solid angle approaches zero, then the reflectance factor approaches the radiance factor. If the solid angle of the cone approaches it, then the reflectance factor approaches the reflectance.

The term "colour measurement instrument" or "measurement instrument" shall mean here and in the following a device to detect light reflected by a target and to disperse the spectrum in its components within the desired range of wavelengths, preferably within the visible spectral range. Various measurement geometries have been established in technical standards such as the 45°/0° and d/8° geometries for the measurement of solid colour shades and various multi-angle measurement geometries such as, e.g., the combinations 45°/15°, 45°/25°, 45°/45°, 45°/75°, 45°/110° for the characterisation of reflective properties of gonioapparent colour shades. However, other novel measurement technologies as, e.g., multispectral imaging devices, can be applied to the measurement task. Such devices allow to reconstruct spectral functions for each pixel of a digital image by analysis of n different channels related to different images taken and related to n different interference filters centred at different wavelengths distributed over the desired spectral range.

The term "solid reflectance standard" or "solid colour shade standard" shall mean herein and in the following a colour shade with optical property of isotropically reflecting a beam of collimated or diffuse incident light. If, e.g., such a colour shade is illuminated by a collimated beam of light at a constant angle, the level of the reflected light and with it the colour will be independent on the viewing angle. Such colour shades can be formulated by means of solid pigments or dyes which may be embedded and dispersed in different media like paint, ceramic, glass, or plastic etc.

The term "gonioapparent reflectance standard" or "colour gonioapparent colour shade standard" shall mean herein and in the following a colour shade with the optical property of anisotropically reflecting a beam of collimated incident light. If, e.g., such a colour shade is illuminated by a collimated beam of light at a constant angle, the level of the reflected light and with it the colour will be strongly dependent on the viewing angle. Such colour shades can be formulated by means of special effect pigments as, e.g., platelet-like Al-pigments and/or interference pigments.

The term "standard instrument profile" shall mean here and in the following an instrument profile of a colour measurement instrument related to the correction of photometric and wavelength scale differences to a primary or reference instrument.

The term "geometry instrument profile" shall mean here and in the following a geometry profile of a colour measurement instrument related to the correction of angle scale differences to a primary or reference instrument.

According to the present invention a set of solid reflectance standards and a set of gonioapparent reflectance standards are used to generate a standard instrument profile and a geometry instrument profile based on the spectral readings obtained between a given pair of colour measurement instruments.

The method of the present invention corrects measurement results obtained for a tilted measurement geometry and includes differences in apertures, too. A method including a generalised error model combining photometric and wavelength scale corrections and angle scale correction, i.e. differences caused by differing geometrical conditions, has been provided. Generally the method is applied in a two-step procedure. In the first step photometric and wavelength scale errors are corrected and subsequently the profiled measurement data are processed through the second stage of geometry error model.

The method of the present invention can be used advantageously in all typical situations of a network of distributed colour measurement instruments, e.g., in paint production or colour development environment, where colour measurement of gonioapparent colour shades is necessary. The steps of the method of the present invention shall be explained in more detail for such a typical situation. The method comprises steps A and B, including sub-steps A1, A2, B1, B2 and B3.

Step A

According to the method of the present invention in step A at least one standard instrument profile for the colour measurement instruments distributed in the network (the colour measurement instruments of the network) is generated according to known methods in order to correct photometric and wavelength scale differences. Usually the network contains a number of colour measurement instruments all referenced to a reference colour measurement instrument (herein and in the following also referred to as the "master instrument"). If the network or system consists only of a master instrument and one secondary colour measurement instrument one standard instrument profile is generated to reflect and correct the measurement differences between the master instrument and the secondary instrument. If the network or system comprises a master instrument and more than one, for example in a range of from two to five, secondary colour measurement instruments, then two to five individual standard instrument profiles can be generated to reflect and correct the measurement differences between the master instrument and each of the secondary instruments. If applicable the network may include only two secondary measurement instruments and no master instrument.

Since the method of the present invention is directed to the measurement of gonioapparentreflectance standards, the colour measurement instruments can be in general goniospectrophotometers. However, as mentioned already above other novel measurement technologies as, e.g., multispectral imaging devices, can be used, too.

In case of goniospectrophotometers all three instrument scales have to be considered, whose actual state has an impact on the accuracy of measurement results: the photometric scale, the wavelength scale, and the angle scale. The former is defined by the calibration of a measurement system by means of a certified white and a black standard, while the latter two instrument scales are adjusted by the instrument manufacturer and therefore defy direct control by the user. Physically meaningful models have been derived for the former two instrument scales and devised for instrument profiling. Those models and their application are known to a person skilled in the art and are used to generate standard instrument profiles.

Step A of the method of the present invention comprises sub-steps A1 and A2.

Step A1

In step A1 a set of solid reflectance standards is measured. Typically a goniospectrophotometer can be used for measurement. The solid reflectance standards have to be selected carefully. Criteria of selection can include those described below in more detail.

Solid reflectance standards can be coated panels or any other appropriate coated or coloured surface as, e.g., ceramic tiles, plastic chips, etc., with isotropic reflectance properties.

The selected solid reflectance standards can be measured on each of the colour measurement instruments distributed in the network, including the reference colour measurement instrument, and at least two measurement geometry configurations, i.e., at all viewing angles to obtain solid standard reflectance spectra of the selected solid reflectance standards. The standard reflectance spectra and the spectral differences between the master instrument and each of the secondary colour measurement instruments distributed in the network can be registered at different wavelengths, for example, within the wavelengths in a range of from 400 nm to 700 nm with a wavelength pitch of 10 nm for each measurement geometry configuration, for each of the solid reflectance standards. The standard reflectance spectra and data on the spectral differences may be stored in a database.

Step A2

In step A2 a standard instrument profile can be generated for each of the colour measurement instruments distributed in the network to correct photometric and wavelength scale differences.

This can be done according to methods well-known to a person skilled in the art. Usually respective guidelines and methods are provided by manufacturers of the colour measurement instruments.

Generally the standard instrument profile can be generated for a pair of the measurement instruments, i.e. for a reference measurement instrument (the master instrument) and a secondary measurement instrument. If necessary it can also be generated for two secondary measurement instruments.

The following provides representative embodiments of the method for generating and utilising a standard instrument profile developed to correct photometric and wavelength scale errors.

Within the framework of a linear physical error model the difference $\Delta R(\varepsilon,\lambda)=R_t(\varepsilon,\lambda)-R(\varepsilon,\lambda)$ between the true measurement value (the reference measurement value) $R_t(\varepsilon,\lambda)$ and an actual measurement value (the measurement value) $R(\varepsilon,\lambda)$ according to $$\Delta R(\varepsilon,\lambda)=R_t(\varepsilon,\lambda)-R(\varepsilon,\lambda)=e(\varepsilon,\lambda)\cdot F(\varepsilon,\lambda)$$

is a product of an error parameter $e(\varepsilon,\lambda)$ and a function $F(\varepsilon,\lambda)$, which is characteristic for the respective error model. The quantities $\varepsilon$ and $\lambda$ denote the aspecular difference angle and the wavelength. For the dominating error contributions of the photometric scale and the wavelength scale the four model functions $e_1$ to $e_4$ listed in Table 1 can be derived. The two error parameters $e_1$ and $e_2$ are related to the photometric scale and depend on both the wavelength $\lambda$ and the difference angle $\varepsilon$, while the error parameters $e_3$ and $e_4$ of the wavelength scale per definition have to be independent of the configuration.

The set of error parameters $e_1$-$e_4$ have to be derived from matching the composite error model function $$\Delta R(\varepsilon, \lambda) = R_t(\varepsilon, \lambda) - R(\varepsilon, \lambda) = \sum_{i=1}^{4} e_i(\varepsilon, \lambda) \cdot F_i(\varepsilon, \lambda)$$

to the measurement results obtained for a discrete set of appropriate solid reflectance standards in the sense of the $L_2$-norm, which have been measured with both instruments to be profiled.

The choice of solid reflectance standards for the profile generation is governed by the mathematical structure of the error functions. In order that a statistically significant estimation of the error parameters $e_i$ is feasible, the spectra of the utilised solid colour standards have to possess structures, giving rise to sufficient activity for all error functions at each wavelength. For the composite error model this can only be guaranteed if the spectra of the standards are sufficiently variable in the second derivative $R''(\varepsilon, \lambda)$ of reflectance with respect to wavelength, which can be ensured by inflexion points distributed over the entire spectral range. Automatically a high degree of activity for the first derivative $R'(\varepsilon, \lambda)$ is attained. To determine the error parameters associated with the photometric scale a set of achromatic spectra of different reflectance level is sufficient. An alternate approach to define a meaningful set of reflectance standards has been devised by A. Ingleson and M. H. Brill, *Methods of selecting a small reflectance standard set as a transfer standard for correcting spectrophotometers*, Color Res. Appl. 31, 13 (2006).

Figure 2:
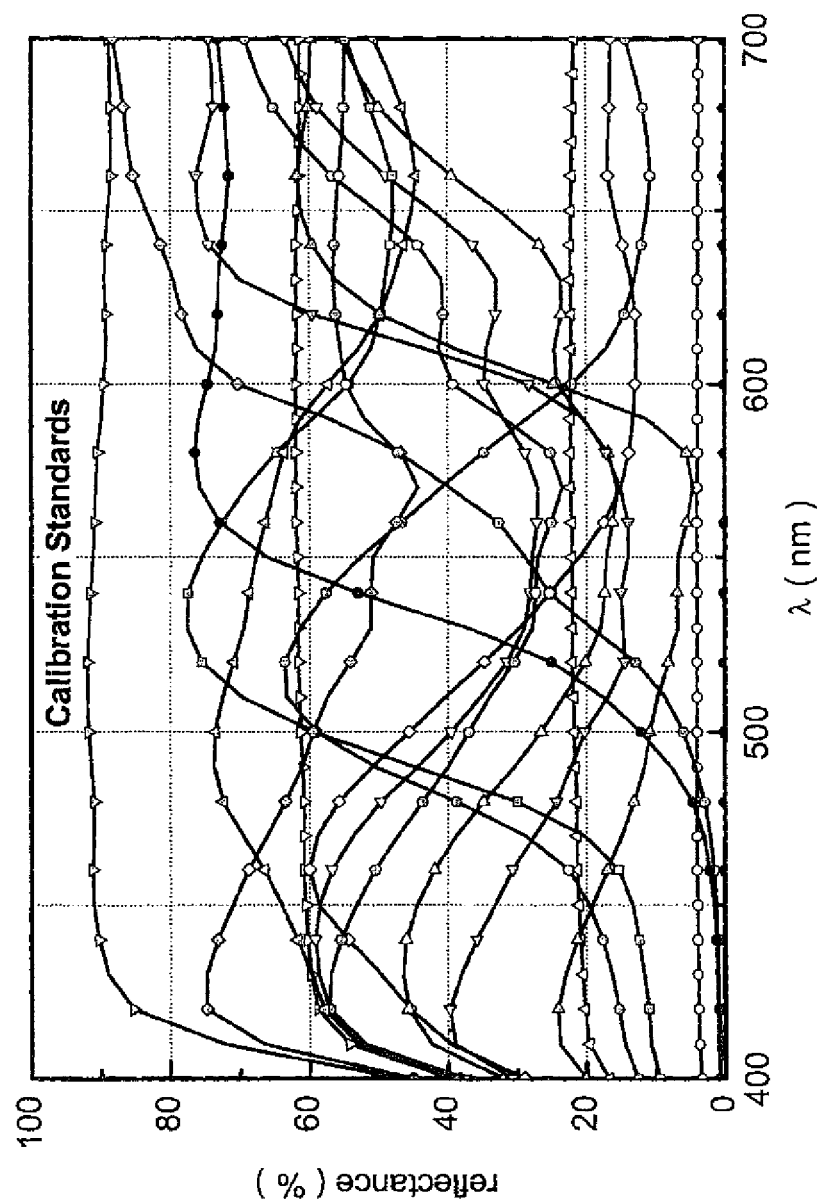
FIG. 2 shows reflectance spectra of a set of 17 solid colour shades utilised for generating standard instrument profiles to correct photometric and wavelength scale errors.

For example, a set of about 14 chromatic and 3 achromatic solid reflectance standards of different lightness level is sufficient to define meaningful instrument profiles (see FIG. 2).

The solid reflectance standards utilised for instrument profiling have to be long-term stable and in the ideal case temperature-independent. Since in particular brilliant solid reflectance standards with steep slopes in their reflectance spectra are subject to a marked colour change with temperature, ambient temperature conditions during the measurement process have to be stabilised to better than ±2° C. Temperature corrections can only be performed if temperature coefficients of all solid reflectance standards are known. Furthermore, the surface of each solid reflectance standard should be texture-free (i.e., highly glossy) and easy to clean.

Step B

In step B of the method of the present invention geometry instrument profiles for the colour measurement instruments of the network are generated in order to correct differences in geometric measurement conditions.

Step B of the method of the present invention comprises sub-steps B1, B2 and B3.

Step B1

In step B1) a set of gonioapparent reflectance standards can be measured at at least two measurement geometry configurations and at each of the colour measurement instruments distributed in the network to obtain gonioapparent standard reflectance spectra. Since parameters of the geometry profiling model are wavelength- and angle-independent, the number of gonioapparent reflectance standards, for example, coated panels, needed to define the profile can be kept very low. In one example, in a range of from 3 to 5 of coated panels can be used as gonioapparent reflectance standards. In another example, a set of 3 to 5 coated panels having metallic colour shades of moderate to high lightness travel with viewing angle can be used as gonioapparent reflectance standards and can be sufficient to derive statistically significant model parameters.

The accuracy of a profile can critically depend on the accuracy of the derivative $dR(\varepsilon, \lambda)/d\varepsilon$ in particular at the 15° angle, which has to be estimated numerically. In case of a low number of measurement angles a sufficiently accurate model function has to be fitted to the experimental data to estimate the angle derivative. This already applies to colour measurement instruments equipped with 5 or less viewing angles, where an accurate estimation of the angle derivative is a numerical challenge.

The gonioapparent reflectance standards can be coated panels or any other appropriate coated or coloured surface as, e.g., ceramic tiles, plastic chips, etc., with isotropic reflectance properties, where the pigment formulation of the coated or coloured surface besides solid pigments contains a sufficient amount of special effect pigments, or any other colour shade anisotropically reflecting collimated incident light.

The gonioapparent reflectance standard spectra of the set of selected gonioapparent reflectance standards can be measured on each of the colour measurement instruments distributed in the network, for example, on each colour measurement instrument to be consolidated in the network; and at least two measurement geometry configurations, for example, at least two combinations of illumination and viewing directions. In one example, the measurement can be done by using a goniospectrophotometer.

The gonioapparent reflectance standard spectra and the spectral differences between the master instrument and each colour measurement instrument of the network can be registered at different wavelengths, for example, within the wavelength range 400 nm to 700 nm with a wavelength pitch of 10 nm for each measurement geometry, for each of the solid reflectance standards. The gonioapparent reflectance standard spectra and data on spectral differences can be stored in a database.

Step B2

In step B2 the standard instrument profile for each colour measurement instrument distributed in the network and generated in step A) is applied to the gonioapparent reflectance standard spectra obtained in step B1), i.e. the gonioapparent reflectance standard spectra are corrected by applying the standard instrument profile to the gonioapparent reflectance standard spectra (by using the corresponding error parameters)

Step B3

In step B3 a geometry instrument profile for each of the colour measurement instruments distributed in the network is generated based on the gonioapparent standard reflectance spectra applied with said standard instrument profile in step B2) that are corrected for photometric and wavelength scale errors.

Generally the geometry instrument profile can be applied for a pair of measurement instruments. In one example, a reference measurement instrument (the master instrument) and a secondary colour measurement instrument can be applied to.

Conventional instrument profiling processes as known to those skilled in the art address only the photometric scale and the wavelength scale, while the geometrical conditions are assumed not to contribute an additional error. In case of solid colours such an assumption is generally fulfilled, but in case of gonioapparent colour shades in particular the reflectance spectrum measured at the 15° angle is very sensitive to a slight tilt of the measurement plane. Bright metallic colours may exhibit slopes in their angular variation of 6%/deg.≤dR/dε≤15%/deg. at the 15° angle. Therefore, even a slight tilt of the measurement plane of 0.1° might lead to differences in reflectance level of 1.2% to 3.0% for the above range of slopes. As will be demonstrated below, the tilt angle has to be doubled to estimate its impact on reflectance.

In case of goniospectrophotometers further systematic error sources have to be considered which are related to the respective geometrical measurement conditions. These geometries are defined by specifying the illumination and viewing angles and their corresponding apertures. Apertures have to be defined in a way that the viewing area is always smaller than the illuminated area and both areas have the same centre position. The geometrical differences in the area sizes have to be chosen carefully, so that edge losses are negligible, while captured reflected intensity is high enough to achieve the desired signal-to-noise ratio.

Small changes of the measurement geometry can be insignificant to the systematic error sources discussed above, if only solid reflectance standards have been utilised as reflectance standards to define instrument profiles. These errors related to the photometric and wavelength scales can therefore be characterised independent of the genuine geometrical/optical measurement conditions. Only after determination of the associated error parameters to the photometric and wavelength scales differences in geometrical measurement conditions may be characterised by analysing photometric and wavelength scale-corrected measurements of a set of representative gonioapparent reflectance standards by means of an appropriate error model. This error model has to address changes in the angles of illumination ($\theta_i$) and viewing ($\theta_e$) as well as differences in their apertures. The aspecular angle ε, which in practical applications is the preferred parameter characterising the measurement geometry used, is related to $\theta_i$ and $\theta_e$ through the equation $$\varepsilon = \pi - \theta_i - \theta_e.$$

FIG. 1 depicts representative schematic views of the measurement geometry. For the reference measurement instrument (the master instrument) (FIGS. 1A, 1C, and 1E), $\theta_i$ denotes the illumination angle, $\theta_e$ the viewing angle, and ε the corresponding aspecular angle of observation. For tilted measurement geometries (FIG. 1B) and rotating of the measurement block about the y-axis (FIG. 1D) of a secondary measurement instrument, the tilt-angle Δθ and new angles of illumination ($\theta_i^* = \theta_i + \Delta\theta$) and viewing ($\theta_e^* = \theta_e + \Delta\theta$) denote the changed angles. In another variation, where the measurement plane is slightly displaced in the z-direction with respect to the reference plane is displayed in FIG. 1F.

In typical goniospectrophotometers available on the market, the illumination and viewing optics are integrated into a compact optics block. In such cases changes in illumination and viewing angles are always rigidly coupled with each other, since both depend on the orientation of the optics block within each instrument. However, the illumination angle and the corresponding aperture might change slightly, if the light source has to be replaced.

Assuming that the measurement head consists of a compact optics block with fixed geometrical relations between $\theta_i$ and $\theta_e$, three different variations (also referred to as "sources of systematic errors" herein) can be considered as shown in FIG. 1 (FIGS. 1B, 1D, and 1F): (i) rotating the measurement block about the x-axis perpendicular to the measurement plane spanned by the illumination and viewing directions (FIG. 1B), ii) rotating the optics block about the y-axis oriented parallel to the measurement plane (FIG. 1D) and (iii) displacement of the measurement or reference plane in the z-direction (FIG. 1F). In general all three sources of systematic errors can be superimposed in practical applications and have to be thoroughly analysed.

The displacement of the measurement plane in the z-direction can have two consequences, namely, changing the size of the illuminated area and viewing areas and displacing both areas with respect to each other on the other. Only in the special case of illuminating and viewing a sample at an angle of $\theta_i = \theta_e = 90°$ both areas stay centred at the same position. If the distance between light source and measurement plane increases, the size of the illuminated area increases, and vice versa. Denoting the perpendicular distance between light source and measurement plane by $z_o$ and assuming the area having a circular shape the ratio of the area A* displaced by Δz and the reference area A can be given by $A^*/A = (1 + \Delta z/z_o)^2$. For $\Delta z/z_o \ll 1$ the ratio can be approximated by $A^*/A \approx 1 + 2\Delta z/z_o$. If the illumination and the viewing areas would stay co-centred at the same position and only the lateral extension is changed, when displacing the measurement plane, there would be an impact on the measurement results only in those cases, where the dimensional scale of sample inhomogeneity is of the same order of magnitude as the change in lateral extension. In practical application, however, both illumination and viewing areas may not stay co-centred when the measurement plane is displaced. If Δz>0, the illumination area in FIG. 1F can be shifted to the right by the amount $\Delta y = \Delta z \cot(\theta_i) = \Delta z$ for $\theta_i = 45°$, while the near-specular viewing area (ε=15°; $\theta_e = 120°$ can be displaced in the opposite direction by the amount $\Delta y = \Delta z \cot(120°) \approx -0.5774 \Delta z$. The viewing area at the flat angle (ε=45°; $\theta_e = 90°$ stays unaffected, while the centre of the high angle (ε=110°, $\theta_e = 35°$ viewing area is displaced further out by $\Delta y = \Delta z \cot(35°) \approx 1.4282 \Delta z$. If Δy is negative the displacement directions of the near-specular and high angles are reversed.

The most critical angle combination is the one, where illumination and viewing areas move in opposite directions. The relative shift of illumination and viewing areas for the 45°/15° measurement geometry is $\Delta y \approx 1.5774 \Delta z$. The 45°/45° measurement geometry with $\Delta y = \Delta z$ is less affected. In case of the 45°/110° measurement geometry the smallest relative shift of $\Delta y \approx 0.4282 \Delta z$ is observed. The relative shift of the illumination and viewing areas can have a negative impact on the measurement accuracy if the ratio of their areas has been chosen inappropriately. Specimen-dependent edge losses might occur, if the size of the viewing area is not small enough compared to the illumination area.

Simple geometrical considerations show that tilting the instrument about the y-axis oriented along the instrument is expected to have only a minor impact on the measurement results. For example tilting the instrument by 5° changes the angle of illumination from $\theta_i = 45°$ to about $\theta_i' = 44.9°$. Therefore, a quantitative analysis of this systematic error source can be skipped at this place in favour of the first case rotating the instrument about an axis perpendicular to the measurement plane.

Rotating the optics block by an angle $\Delta\theta$ about an axis perpendicular to the plane of measurement changes both the angles of illumination and observation, i.e., $$\theta_i' = \theta_i + \Delta\theta,$$

$$\theta_e' = \theta_e + \Delta\theta.$$

Consequently, the aspecular angle $\varepsilon$ changes to $$\varepsilon' = \pi - \theta_i' - \theta_e' = \varepsilon - 2\Delta\theta,$$

here the sample tilt $\Delta\theta$ enters twice.

The usual functional representation $R=f(\varepsilon)$ of the reflectance function depending only on the aspecular angle c suggests that this is a one-dimensional function. Implicitly $\varepsilon$ and hence R depends on the angle of illumination $\theta_i$ as well as the viewing angle $\theta_e$ (see FIG. 1). Therefore, a two-dimensional Taylor expansion of R about the point $(\theta_{i,o}, \theta_{e,o})$ has to be performed accounting for small increments $\Delta\theta_i$ and $\Delta\theta_e$ of both angles:

$$R(\theta_i, \theta_e) \approx R(\theta_{i,o}, \theta_{e,o}) + \frac{\partial R(\theta_i, \theta_e)}{\partial \theta_{i,o}}(\theta_i - \theta_{i,o}) +$$

$$\frac{\partial R(\theta_i, \theta_e)}{\partial \theta_{e,o}}(\theta_e - \theta_{e,o}) + \frac{1}{2}\left\{\frac{\partial R^2(\theta_i, \theta_e)}{\partial \theta_{i,o}^2}(\theta_i - \theta_{i,o})^2 + \right.$$

$$\left.\frac{\partial R^2(\theta_i, \theta_e)}{\partial \theta_{e,o}^2}(\theta_e - \theta_{e,o})^2 + 2\frac{\partial R^2(\theta_i, \theta_e)}{\partial \theta_{i,o}\partial \theta_{e,o}}(\theta_i - \theta_{i,o})(\theta_e - \theta_{e,o})\right\} + \ldots$$

Keeping only terms up to the first order reduces this expression to $$R(\theta_i, \theta_e) \approx R(\theta_{i,o}, \theta_{e,o}) + \frac{\partial R(\theta_i, \theta_e)}{\partial \theta_{i,o}}(\theta_i - \theta_{i,o}) + \frac{\partial R(\theta_i, \theta_e)}{\partial \theta_{e,o}}(\theta_e - \theta_{e,o})$$

Since $\varepsilon = \pi - \theta_i - \theta_e$, both partial derivatives $\partial\varepsilon/\partial\theta_i$ and $\partial\varepsilon/\partial\theta_e$ are equal to $-1$, so that the Taylor series expansion of $R(\theta_i, \theta_e)$ about $(\theta_{i,o}, \theta_{e,o})$ may be written as $$R(\varepsilon(\theta_i, \theta_e)) \approx R(\varepsilon_o) - \frac{\partial R(\varepsilon)}{\partial \varepsilon_o}\{(\theta_i - \theta_{i,o}) + (\theta_e - \theta_{e,o})\}$$

which can be reduced further to $$R(\varepsilon(\theta_i, \theta_e)) \approx R(\varepsilon_o) - 2\frac{\partial R(\varepsilon)}{\partial \varepsilon_o}\Delta\theta = R(\varepsilon_o) - \frac{\partial R(\varepsilon)}{\partial \varepsilon_o}\Delta\varepsilon$$

for the special case $\theta_i - \theta_{i,o} = \theta_e - \theta_{e,o} \equiv \Delta\theta$. The last equality follows from $\Delta\varepsilon = \varepsilon - \varepsilon' = 2\Delta\theta$.

Thus, in the considered linear approximation changes of the measurement geometry can be expressed by the first derivative of the reflectance function with respect to the aspecular angle $\varepsilon$. Since generally $\partial R/\partial \varepsilon < 0$, for $\Delta\theta < 0$ reflectance values are reduced, while for $\Delta\theta > 0$ they are enlarged by the same amount, i.e., both changes have to be symmetric with respect to the reference plane.

In terms of the error model developed for the photometric and wavelength instrument scales the angular scale error model reads $$R_t(\lambda, \varepsilon) - R(\lambda, \varepsilon) = e_5 \cdot \frac{\partial R(\lambda, \varepsilon)}{\partial \varepsilon}$$

with $e_5 = -\Delta\varepsilon = -2\Delta\theta$. In a similar fashion an error function for geometrical conditions in viewing apertures can be derived according to $$R_t(\lambda, \varepsilon) - R(\lambda, \varepsilon) = e_6 \cdot \frac{\partial^2 R(\lambda, \varepsilon)}{\partial \varepsilon^2}$$

with $e_6$ related to a complex expression accounting for aperture differences.

This error contribution is proportional to the second derivative of reflectance with respect to viewing angle. In a composite error model both geometry-dependent contributions can be combined in a linear mathematical construct with two parameters to be estimated by fitting the model to the experimental data.

In the following Table 1 model functions for the four dominating error contributions of the photometric scale and the wavelength scale are shown. The former two error parameters depend on wavelength and configuration, while the following two are only wavelength-dependent. The last two error parameters $e_5$ and $e_6$ are independent on wavelength and configuration.

TABLE 1

| Error Type | Error Parameter | Error Function $F_i(\varepsilon, \lambda)$ |
| --- | --- | --- |
| photometric zero error | $e_1(\varepsilon, \lambda)$ | 1 |
| photometric scale error | $e_2(\varepsilon, \lambda)$ | $R(\varepsilon, \lambda)$ |
| wavelength error | $e_3(\lambda)$ | $R'(\varepsilon, \lambda) = dR(\varepsilon, \lambda)/d\lambda$ |
| bandwidth error | $e_4(\lambda)$ | $R''(\varepsilon, \lambda) = d^2R(\varepsilon, \lambda)/d\lambda^2$ |
| geometry error | $e_5$ | $R'(\varepsilon, \lambda) = dR(\varepsilon, \lambda)/d\varepsilon$ |
| aperture error | $e_6$ | $R''(\varepsilon, \lambda) = d^2R(\varepsilon, \lambda)/d\varepsilon^2$ |

The general approach described above to correct spectral differences of pairs of instruments and improve conformity of measurement results is not restricted to models explicitly derived and adapted to the physical design of colour measurement instruments. The analytical error model may be replaced by a self-learning neural network system of appropriate topology, which is model-independent and forms its own internal structure to model differences of instrument scales.

The method of the present invention further comprises step C, including sub-steps C1, C2 and C3.

Step C

In step C both the standard instrument profile and the geometry instrument profile are applied to target gonioapparent measurement data. Step C comprises the sub-steps C1, C2 and C3.

Step C1

Target gonioapparent measurement data of a target are obtained and can be measured using one or more of the colour measurement instruments distributed in the network.

Step C2

In step C2 the standard instrument profile generated in step A) is applied to the target gonioapparent measurement data to generate photometric and wavelength scale corrected target measurement data.

Step C3

In step C3) the geometry instrument profile generated in step B) is applied to the results obtained in step C2, i.e. to the photometric and wavelength scale corrected target measurement data obtained in step C2, to generate the calibrated colour data of the target.

Due to the application of the geometry instrument profile, differences between spectra of the reference measurement instrument (the master instrument) and the secondary measurement instrument can be further minimized.

Another important step in the process chain is the assessment of the performance of the obtained final instrument profiles (standard instrument profile and geometry instrument profile. Such a performance assessment may include analyses of spectral differences between unprofiled and profiled data sets, which also can be converted to specific, e.g. lightness, chroma and hue differences, and total colour differences generated in a uniform colour space.

Figure 9:
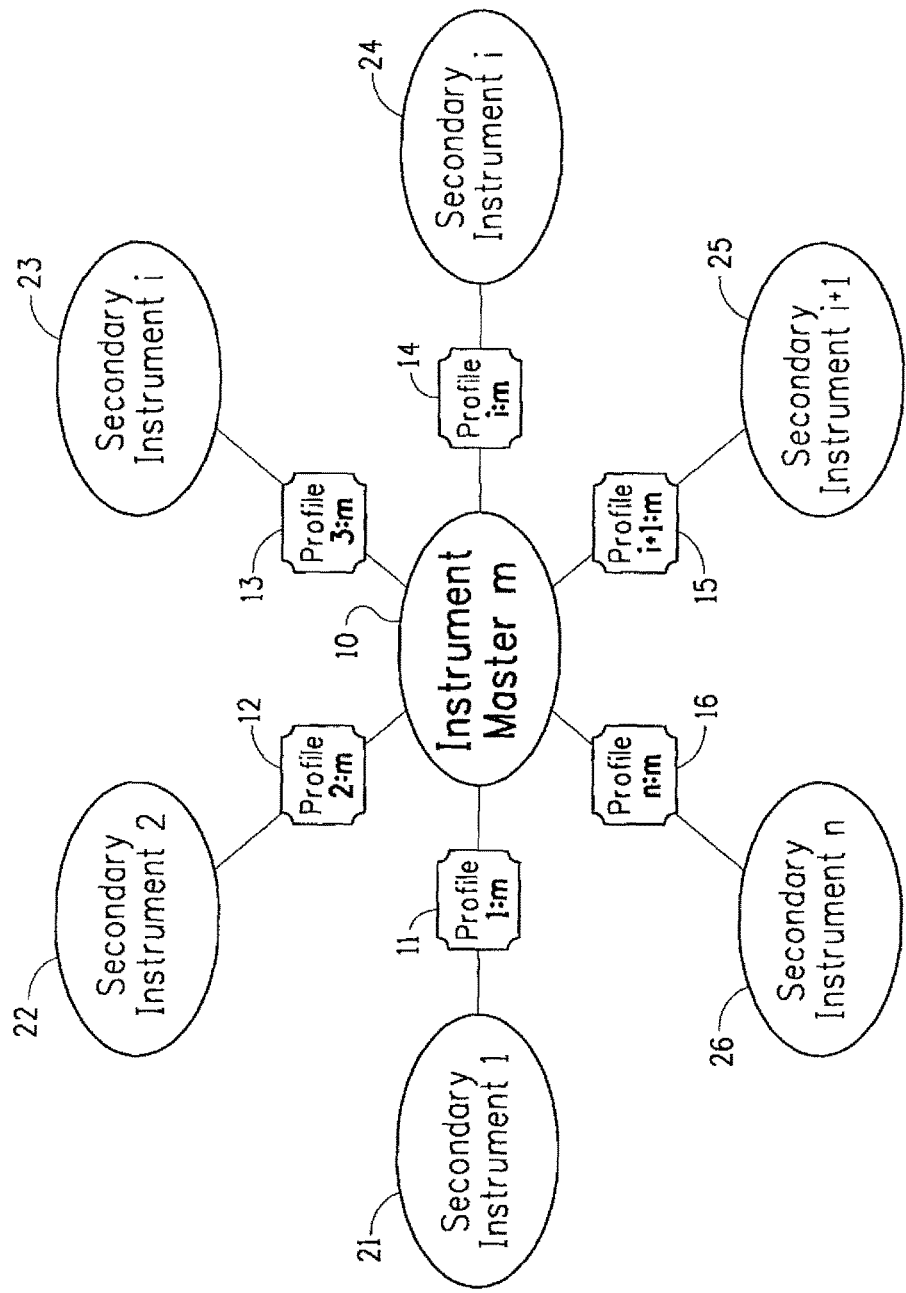
FIG. 9 shows an example of a schematic representation of a network of distributed colour measurement instruments, all referenced to a master instrument or a device-independent digital standard.

The method of the present invention can be used in general to build up a network of managed colour measurement instruments, such as goniospectrophotometers, of high flexibility. The method can improve comparability of measurement results obtained at different colour measurement instruments distributed in the network. Various configurations can be established. One example includes the schematic representation shown in FIG. 9, where a single colour measurement instrument is the master instrument (10) of the network, and one or more secondary colour measurement instruments (21 through 26) can be profiled to have individual profile (11 through 16) to reference the master instrument. Secondary colour measurement instruments can be, for example colour measurement instruments at different production sites, different measurement locations, different automotive body shops, or a combination thereof. In another example, each of the colour measurement instruments distributed in the network is referenced to a master instrument.

In another example, each of the colour measurement instruments distributed in the network is referenced to a digital standard. A master instrument can be optional in this configuration, i.e., all colour measurement instruments distributed in the network can be referenced to the same digital standard. A digital standard can be a digital data file that can comprise pre-defined spectra data at pre-defined measurement conditions described herein. In yet another example, each secondary colour measurement instrument in the network can be profiled to another secondary colour measurement instrument of the network using the same sets of solid reflectance standards and of the gonioapparent reflectance standards, measured under well-controlled conditions on the respective instrument pair.

Generally the method of the present invention can be used in practical applications where differences in geometrical measurement conditions may occur. In one example, the method can be used where colour measurement instruments can be slightly tilted by the operator during the measurement process. In another example, the method can be used where colour measurement instruments can be mounted in a measurement robot used in an application where contact-free measurements have to be carried out, e.g. in OEM coating applications.

The present invention is further defined in the following Examples. It should be understood that these Examples, while indicating preferred embodiments of the invention, are given by way of illustration only.

EXAMPLES

The colour measurement instrument network used herein consists of two portable MA-90BR goniospectrophotometers of X-Rite equipped with the three collimated measurement geometries 45°/15°, 45°/45°, 45°/110°, where the sample can be illuminated at the first angle of 45° and viewed at the following three aspecular difference angles (15°, 45°, 110°). The instruments provide spectral data within the wavelength range 400 nm≤λ≤700 nm with a wavelength pitch of 10 nm for each measurement geometry.

(A) Generating Standard Instrument Profile (Photometric and Wavelength Scale)

Seventeen different formulations of solid reflectance standards were utilised to generate the standard instrument profile. All 17 standards were measured under constant ambient temperature conditions of about 22° C. Measurement data of the 17 standards are shown in FIG. 2.

Figures 3C, 3D:
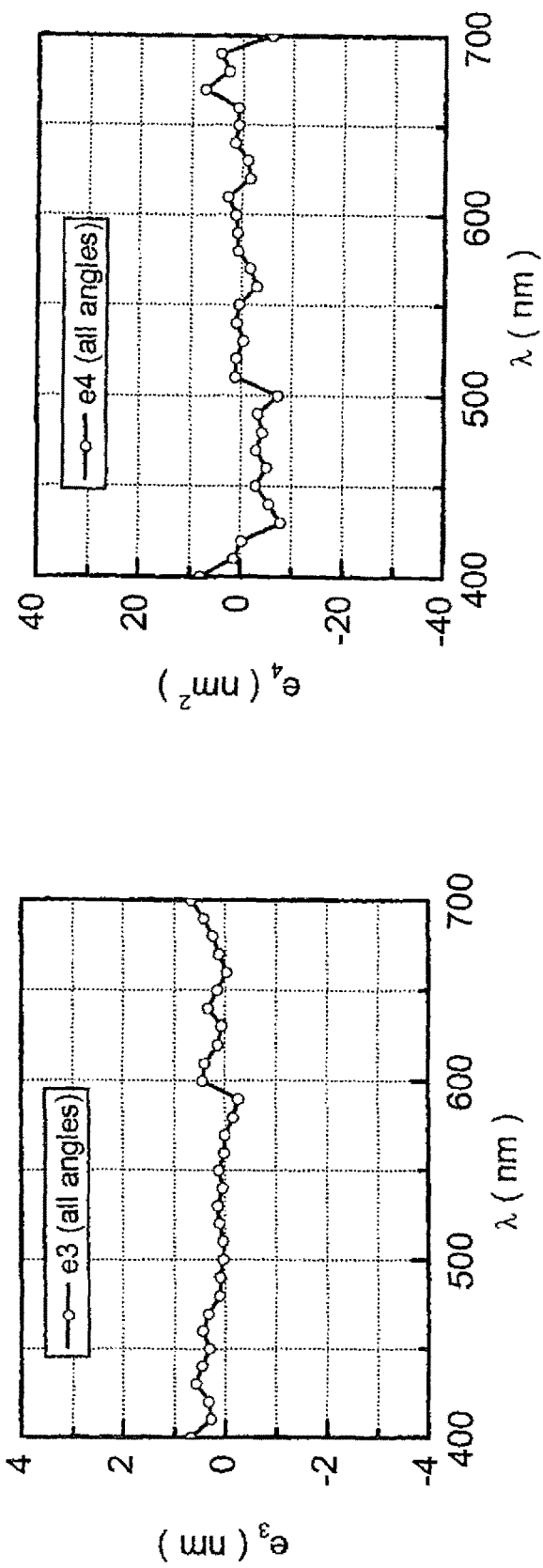
FIG. 3 shows standard instrument profiles between two portable MA90BR goniospectrophotometers, equipped with the measurement geometries 45°/15°, 45°/45°, and 45°/110°. The error parameters $e_1$ and $e_2$ are related to the photometric scale (FIGS. 3A and 3B) and the error parameters $e_3$ and $e_4$ to the wavelength scale (FIGS. 3C and 3D).
Figure 4A:
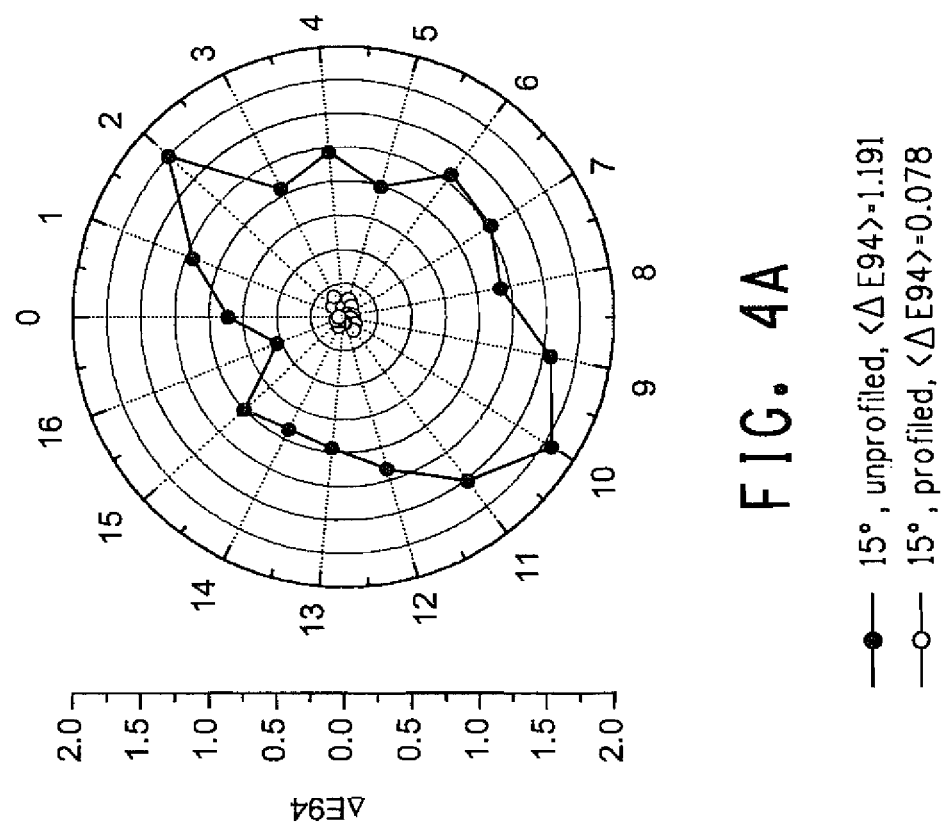
FIG. 4 shows the performance of a standard instrument profile generated for two portable MA90BR goniospectrophotometers, equipped with the measurement geometries 45°/15°, 45°/45°, and 45°/110°, for the data set of 17 solid colour shades in CIE94 colour difference space. Solid circles symbolise uncalibrated (here and in the following also referred to as "un-profiled") data and open circles calibrated (here and in the following also referred to as "profiled") data (FIG. 4A-4C).
Figure 4B:
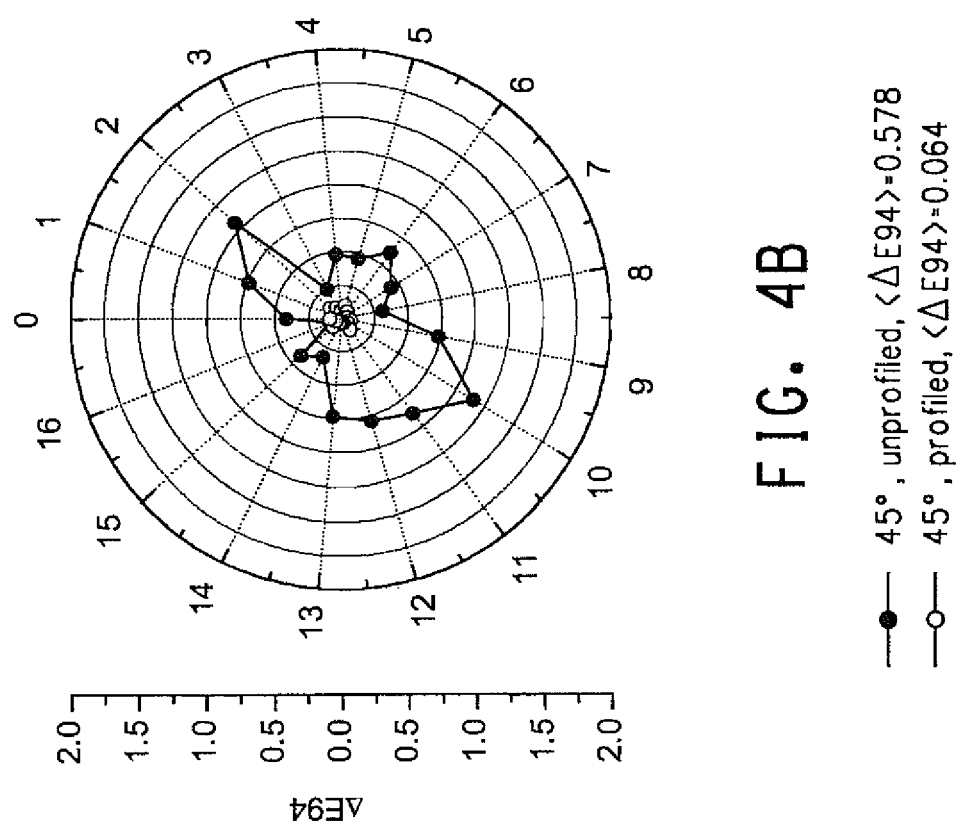
Figure 4C:
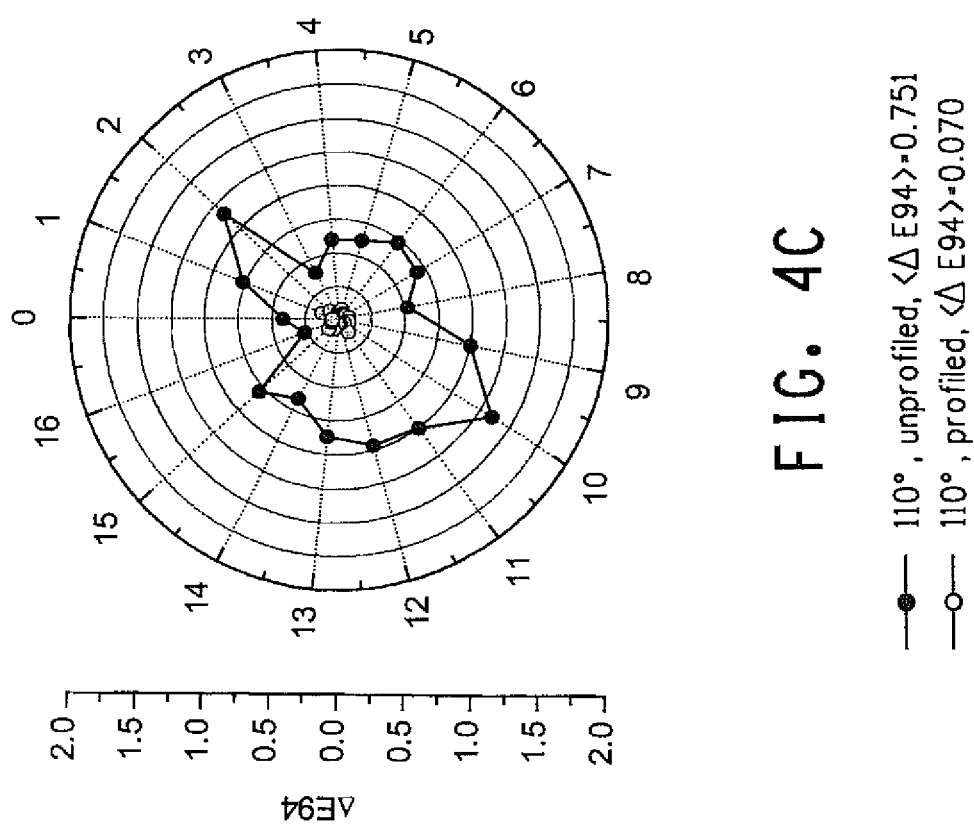
Figure 5B:
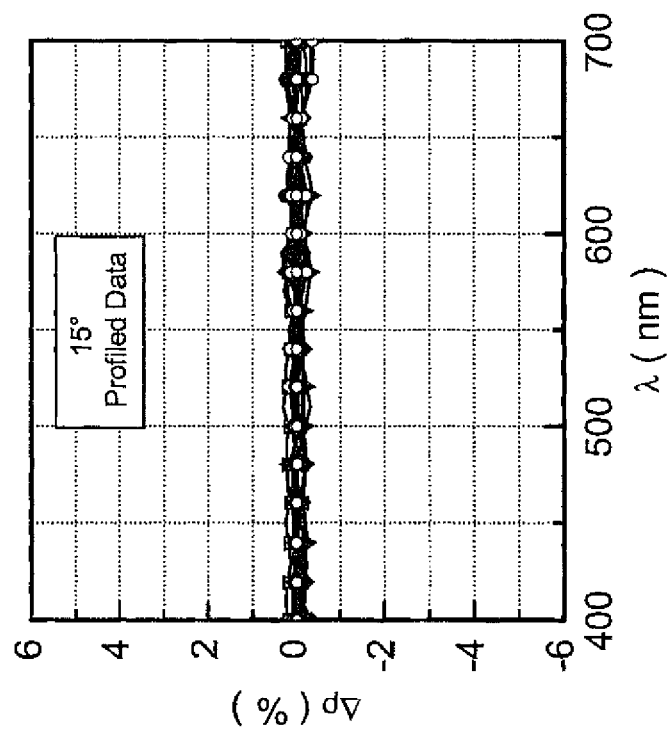
FIG. 5 shows spectral differences between two portable MA90BR goniospectrophotometers of an uncalibrated (un-profiled) (FIGS. 5A, 5C, and 5E) and a calibrated (profiled) (FIGS. 5B, 5D, and 5F) data set for the measurement geometries 45°/15°, 45°/45°, and 45°/110°.
Figure 5A:
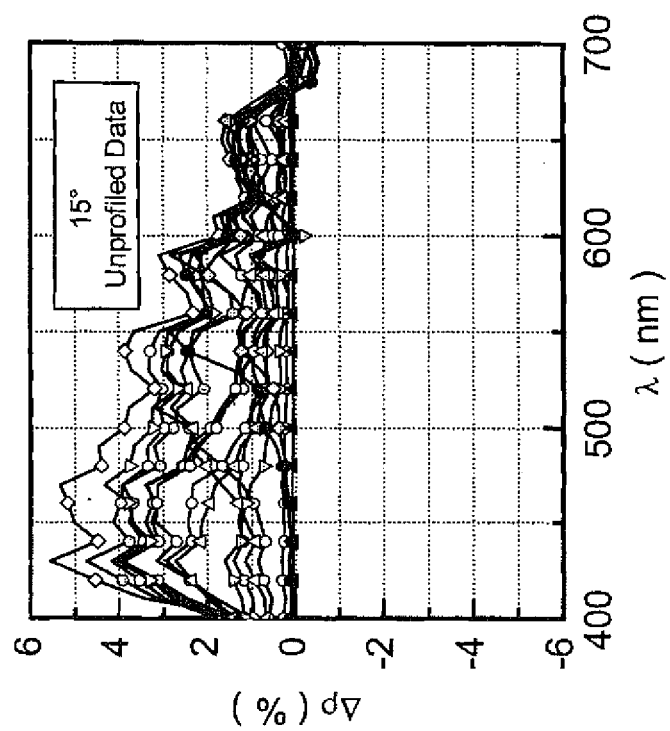
Figure 5D:
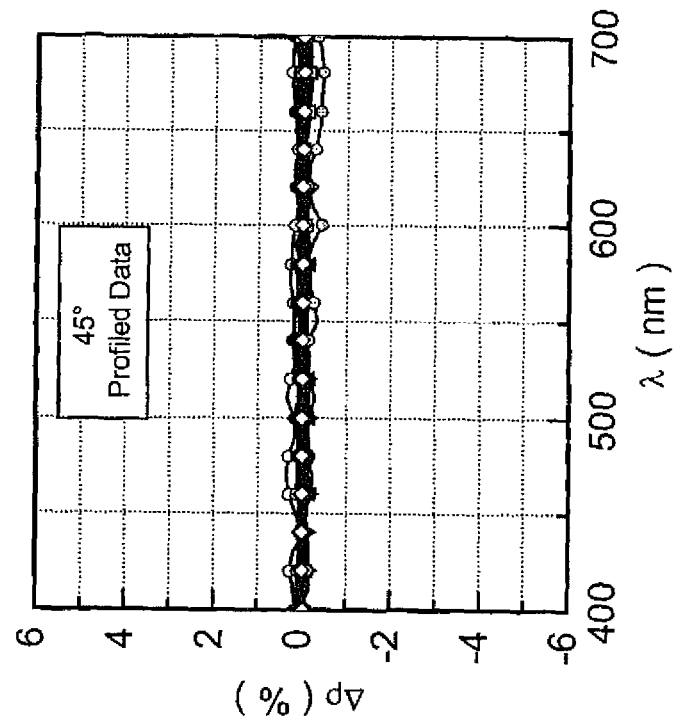
Figure 5C:
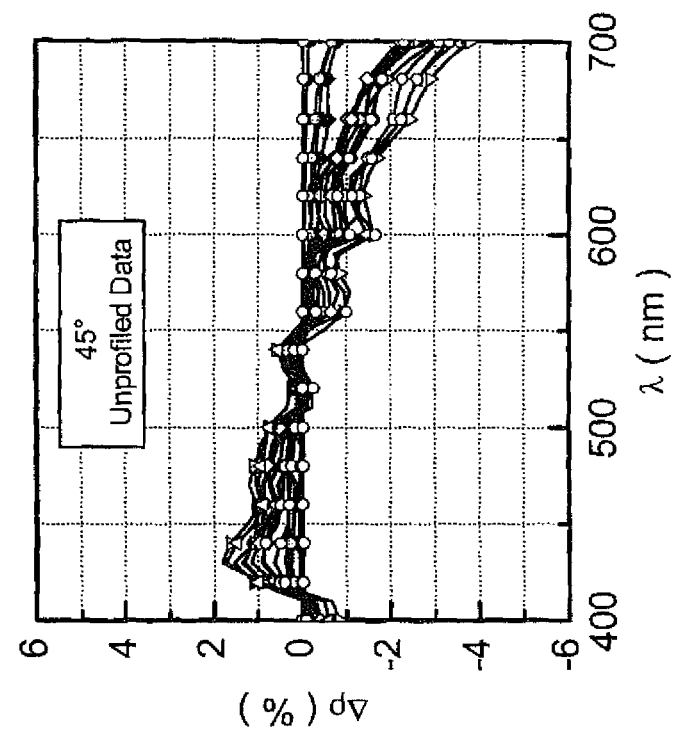
Figure 5F:
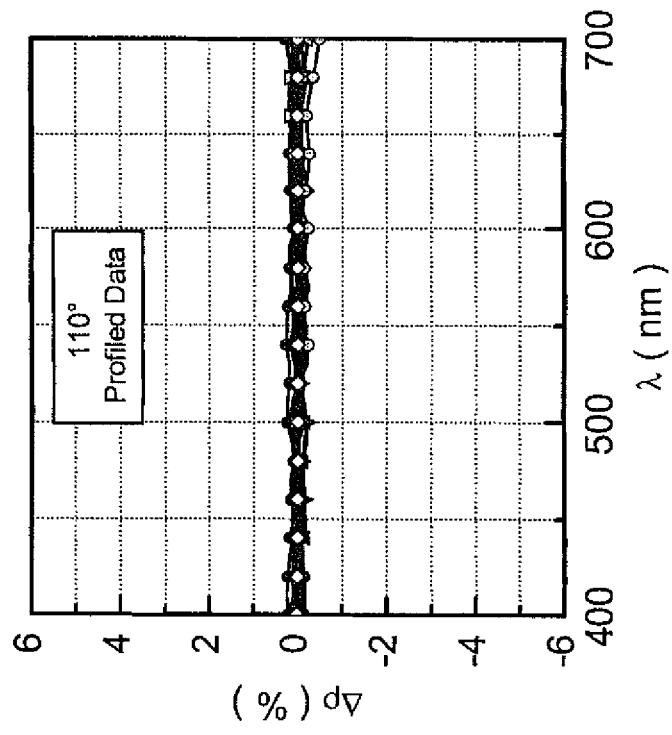
Figure 5E:
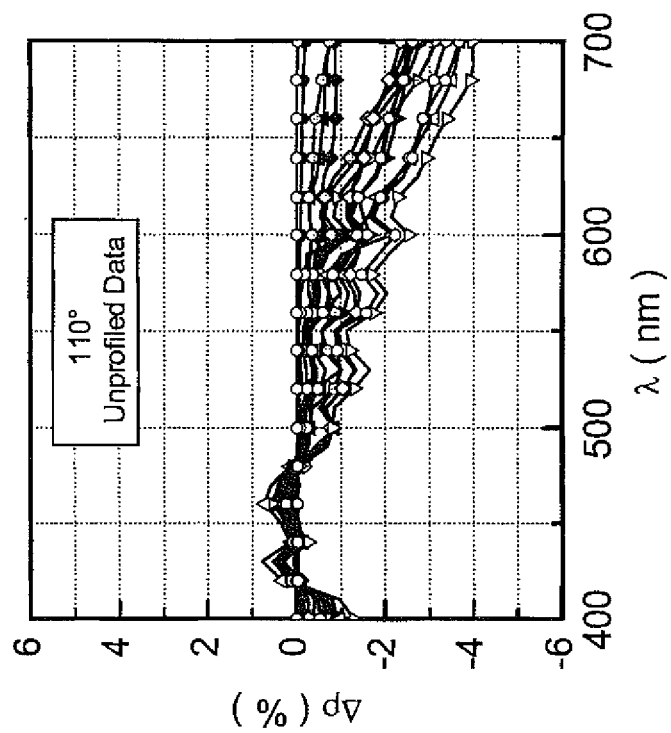
Figure 6D:
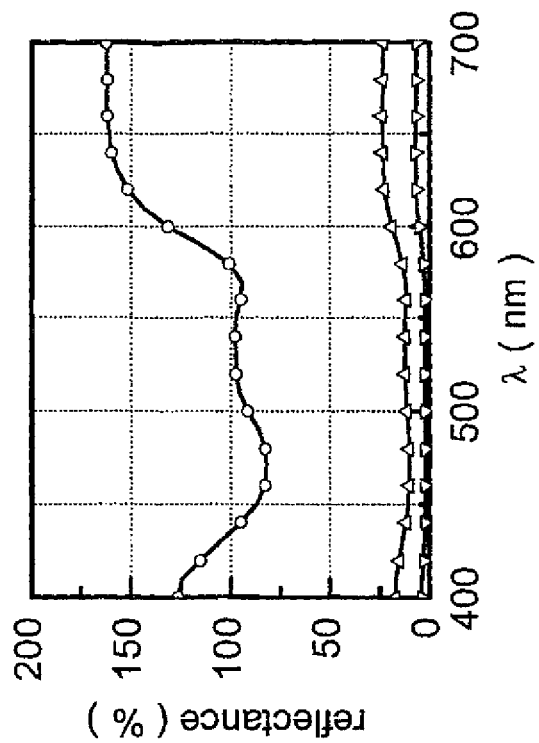
FIG. 6 shows the reflectance spectra of a set of 10 gonioapparent colour shades at three different viewing angles (15°, 45°, 110°) utilised for testing the performance of the standard instrument profile and for generating the instrument geometry profile to correct angle scale errors (FIGS. 6A-6H and 6J-6K).
Figure 6C:
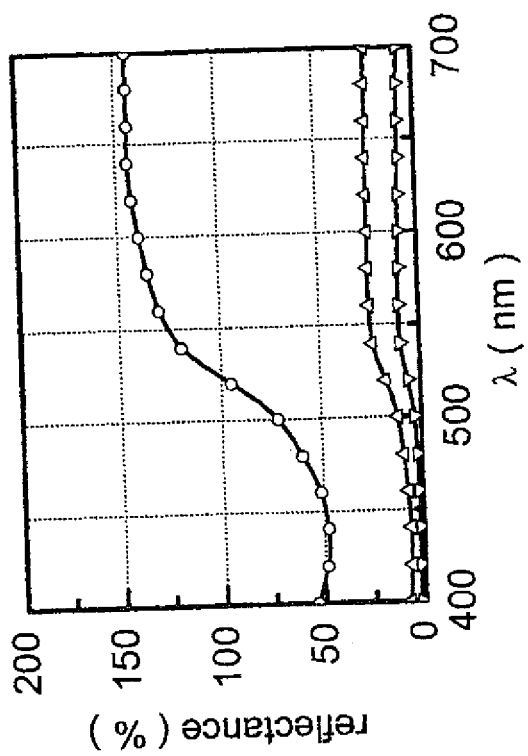
Figure 6E:
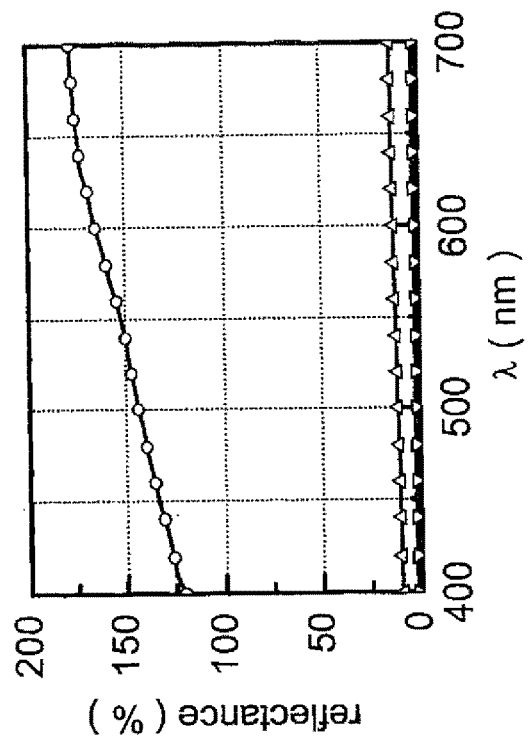
Figure 6F:
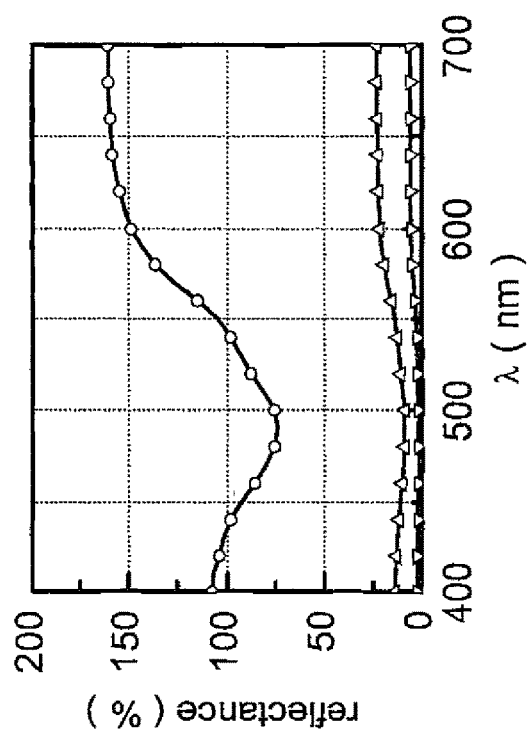
Figure 6H:
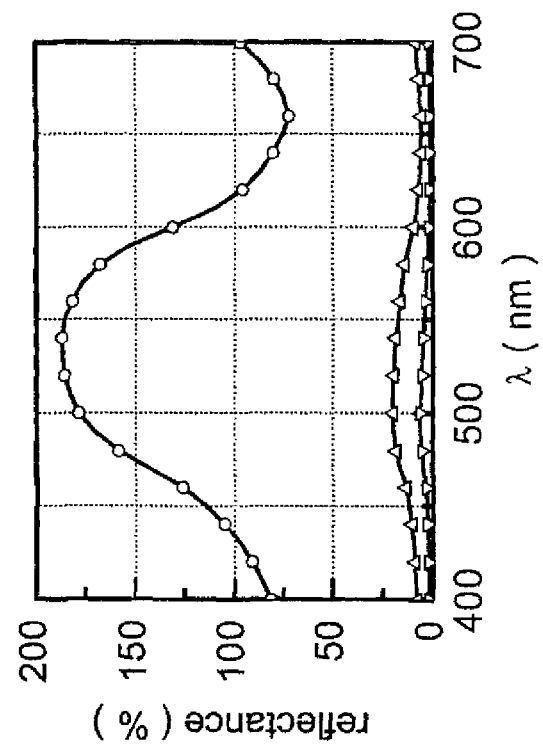
Figure 6G:
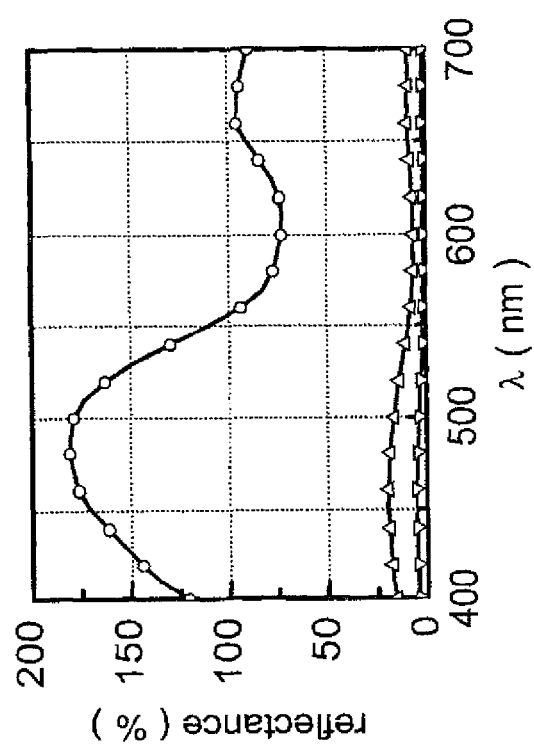
Figure 6K:
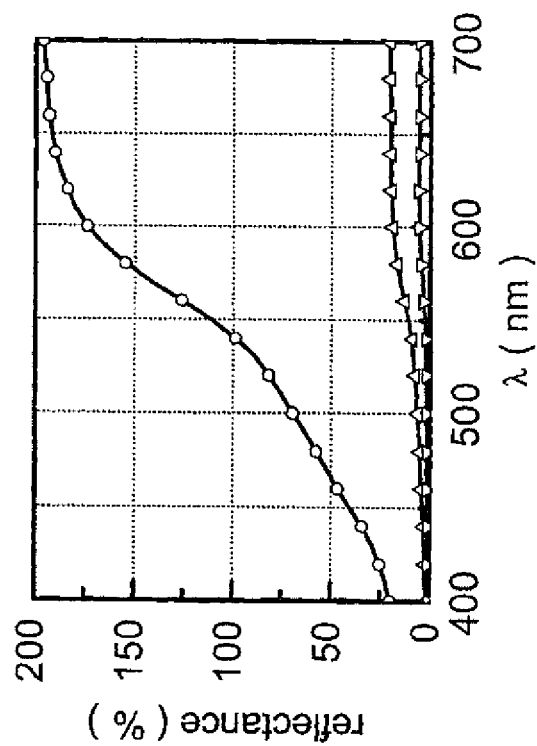
Figure 6J:
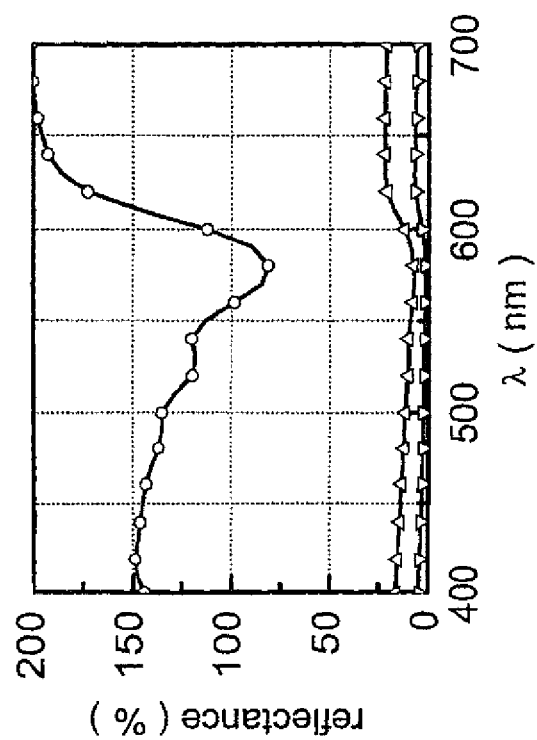

Colour measurement data were collected. Examples of representative data are shown in FIGS. 3-5. FIG. 3 displays four error parameters $e_1$-$e_4$ of the utilised composite error model representing the standard instrument profile. Since the profile was determined based on two instruments identical in construction, the error contributions of the wavelength scale ($e_3$,$e_4$) within the measurement precision were negligible. The error contributions associated with the photometric scale ($e_1$,$e_2$) were significantly different from zero and dominated the error model. The parameter $e_1$ is a measure of the photometric zero error, $e_2$ describes the photometric scale error of the white standard used to calibrate the respective instrument. At each of the measurement geometries (configurations), the contributions of both errors $e_1$ and $e_2$ were of comparable order of magnitude. As already noted above, for each configuration, an individual data set exists and was collected.

The respective colorimetric data of the data set used to create the standard instrument profile are depicted in FIG. 4. Here the residual colour difference according to the CIE94 colour difference metric for the un-profiled and profiled data sets for all solid reflectance standards are displayed. For the average values the measurement data as shown in Table 2 result.

TABLE 2

| angle | unprofiled $<\Delta E_{94}>$ | profiled $<\Delta E_{94}>$ |
|---|---|---|
| 15° | 1.551 | 0.083 |
| 45° | 0.445 | 0.085 |
| 110° | 0.985 | 0.054 |

Since the measured solid samples were perfectly glossy, the performance of the instrument profile was independent of the measurement geometry. In the samples measured, the data after calibration (herein referred to as "profiled") show reduced deviations between the master instrument and a secondary colour measurement instrument. In case of non-perfect glossy samples, the residual error at the 15° viewing angle due to the proximity to the gloss angle was higher compared to angles far from specular.

The spectral differences between the two colour measurement instruments for the measured training or calibration colours at selected measurement geometries before and after profiling are shown in FIG. 5. The uncalibrated (herein referred to as "un-profiled") spectral residues were distributed asymmetrically relative to the zero line and exhibit marked variations significantly exceeding the statistical measurement error with deviations of up to 2.5%. The spectral residues of the calibrated (herein referred to as "profiled") data set were symmetrically distributed relative to the zero line and statistically distributed with a variance corresponding to the specification of the instrument manufacturer in the technical data sheet. The spectral differences at the other two measurement geometries 45°/15° and 45°/110° closely resembled those obtained for the 45°/45° measurement geometry.

The set of solid reflectance standards utilised for the generation of the standard instrument profiles were chosen so that spectra differences were not statistically significant.

(B) Generating Geometry Instrument Profile

An independent set of 10 gonioapparent reflectance standards (also known as gonioapparent colour shades) were measured to obtain gonioappearant standard reflectance spectra and the respective spectra data are displayed in FIG. 6.

Figure 8B:
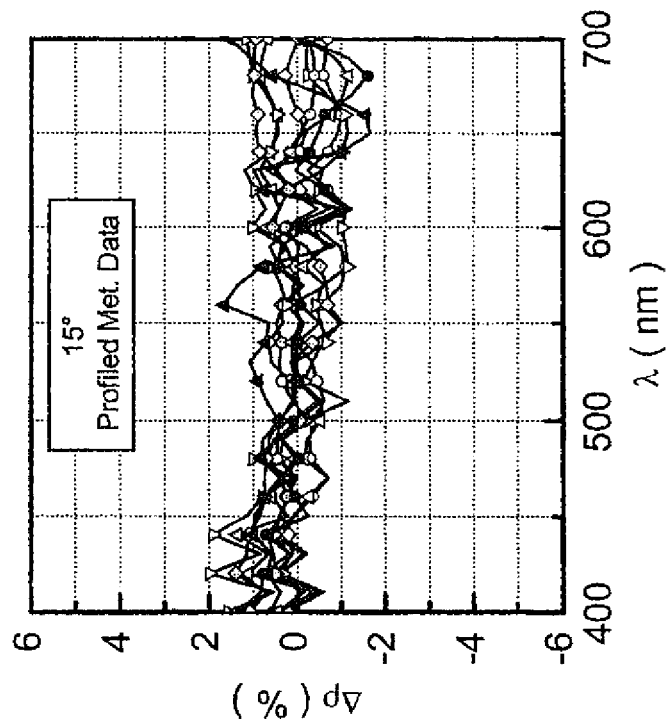
FIG. 8 shows the spectral differences between two portable MA90BR goniospectrophotometers of the uncalibrated (FIGS. 8A, 8C, and 8E) and calibrated (FIGS. 8B, 8D, and 8F) data set of the 10 gonioapparent colours for the measurement geometries 45°/15°, 45°/45°, and 45°/110°, respectively.
Figure 8A:
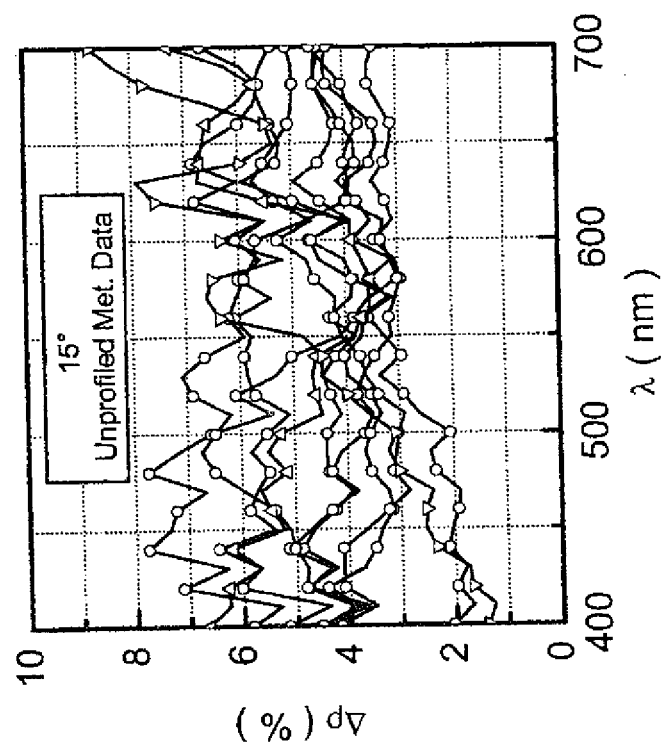
Figure 8D:
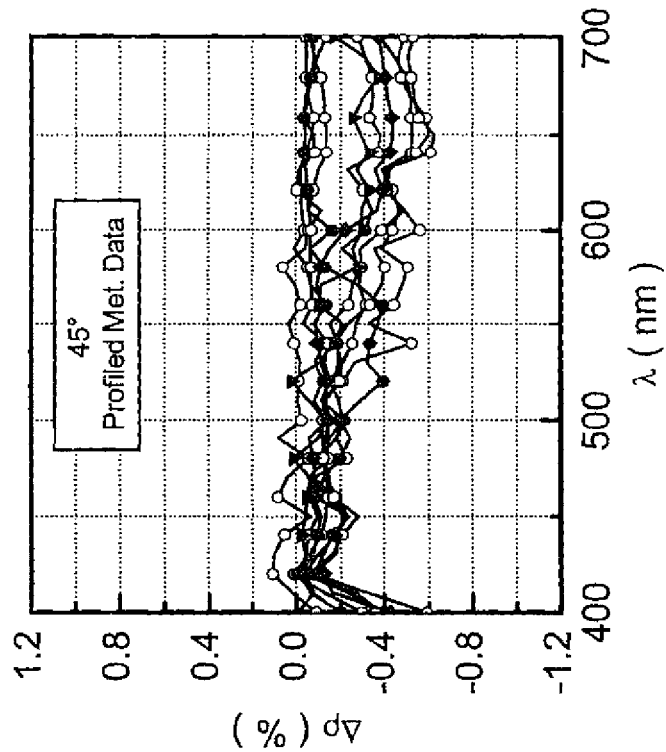
Figure 8C:
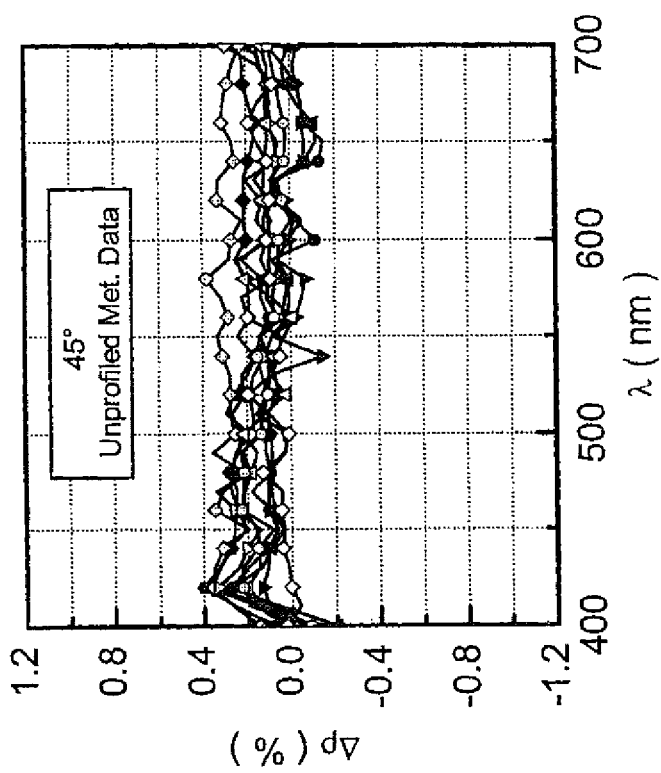
Figure 8E:
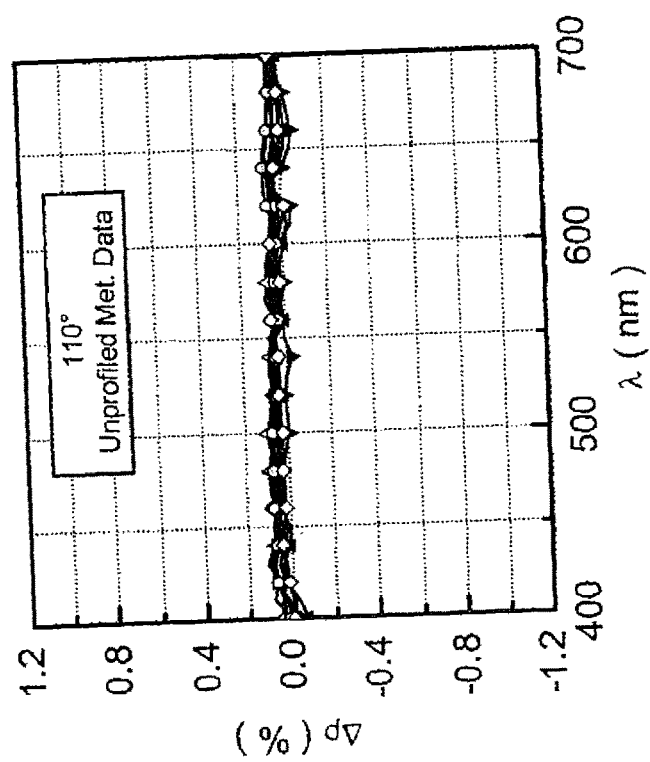

The standard instrument profile generated above was applied to the measured reflectance spectra data to obtain profiled gonioapparent standard reflectance spectra. The profiled gonioapparent standard reflectance spectra obtained were still not centred about zero, particularly at the near specular angle of 15° (FIGS. 8A, 8C, and 8E). This asymmetry was an indication of slightly different geometrical configurations for both instruments, which have to be reduced by means of a geometry instrument profile.

A geometry instrument profile was derived from the gonioappearant standard reflectance spectra data, as shown in FIG. 6, leading to the performance data displayed in FIGS. 7 (colour difference data) and 8 (spectral differences). In this example, the geometry instrument profile was represented by a single (wavelength-independent) parameter $e_5$=0.548%/deg, which is equivalent to a tilt angle of $\Delta\theta \approx -0.28°$.

(C) Generating Calibrated Colour Data

The standard instrument profile generated above was applied to the measured reflectance spectra data from the 10 gonioapparent reflectance standards now treated as target gonioapparent measurement data to generate photometric and wavelength scale corrected target measurement data.

The geometry instrument profile generated above was applied to the photometric and wavelength scale corrected target measurement data.

Figure 7A:
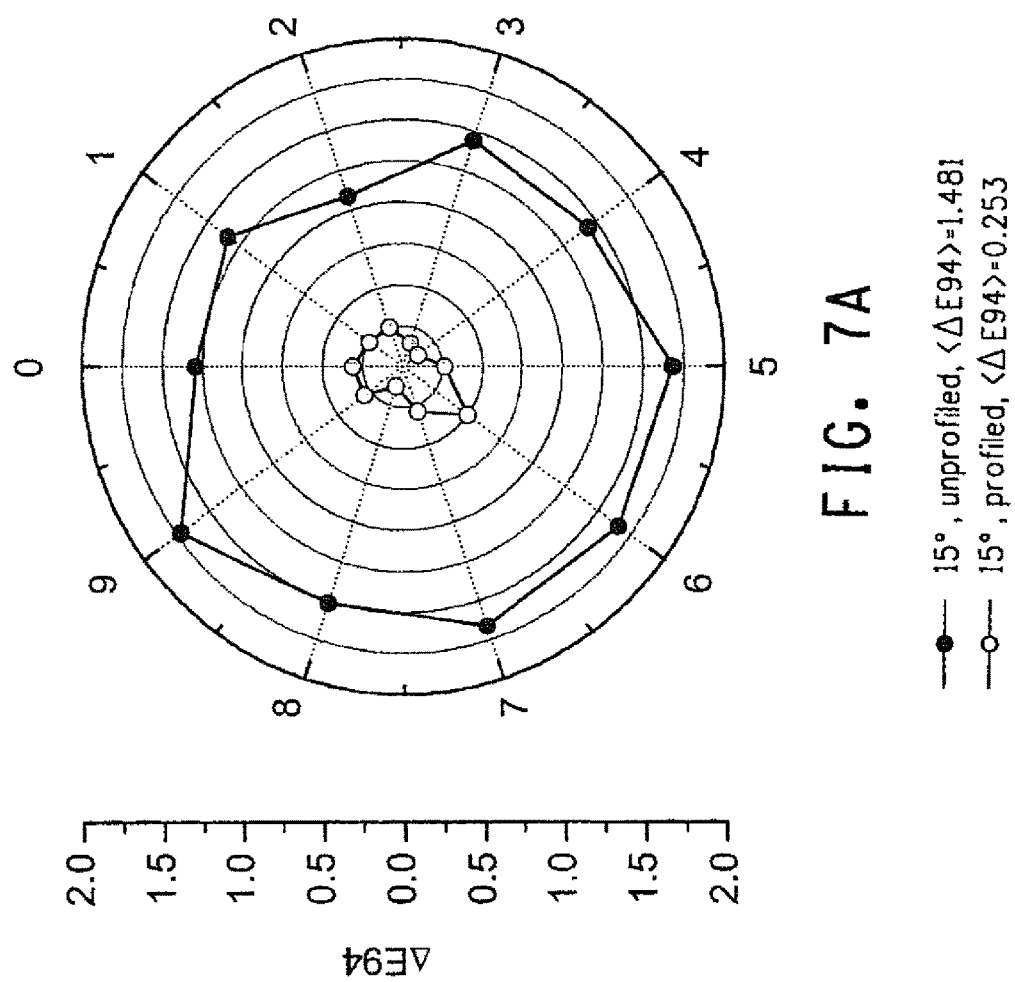
FIG. 7 shows the performance of a geometry instrument profile generated for two portable MA90BR goniospectrophotometers, equipped with the measurement geometries 45°/15°, 45°/45°, and 45°/110°, for the data set of the 10 gonioapparent colour shades in CIE94 colour difference space. Solid circles symbolise uncalibrated data and open circles calibrated data (FIG. 7A-7C).
Figure 7B:
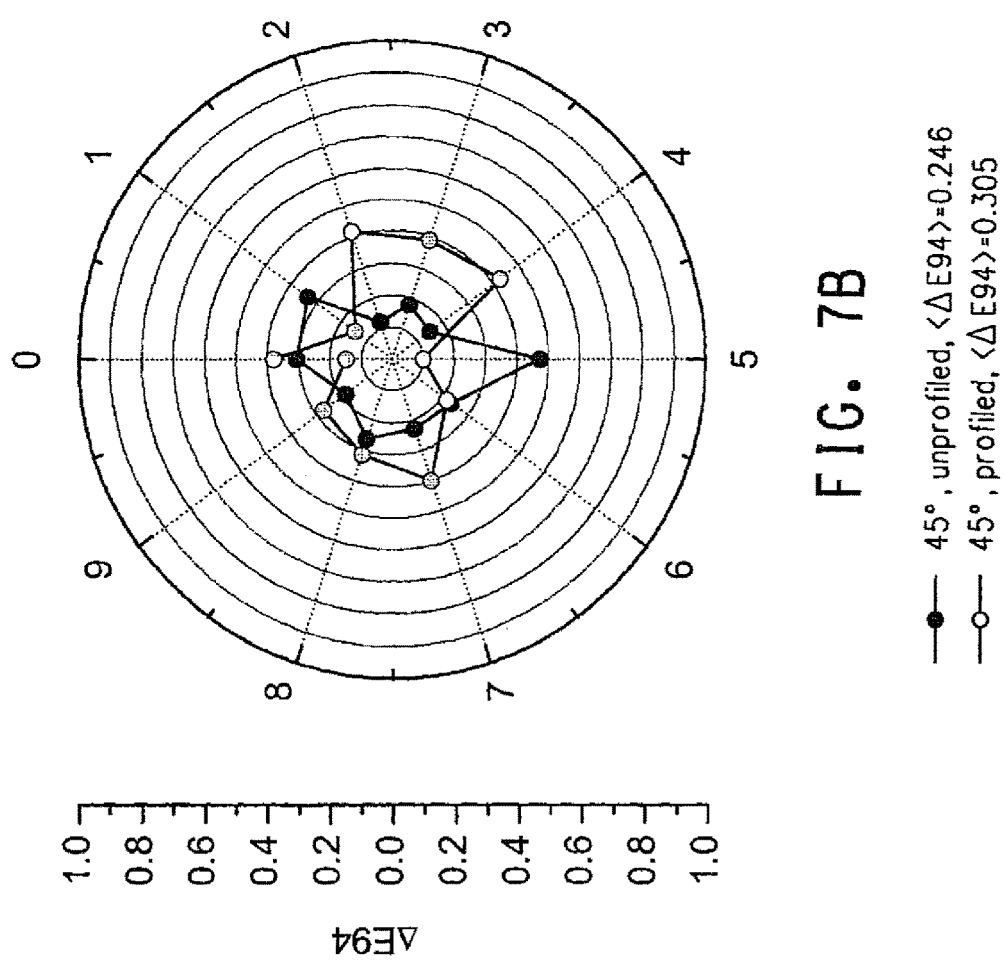
Figure 7C:
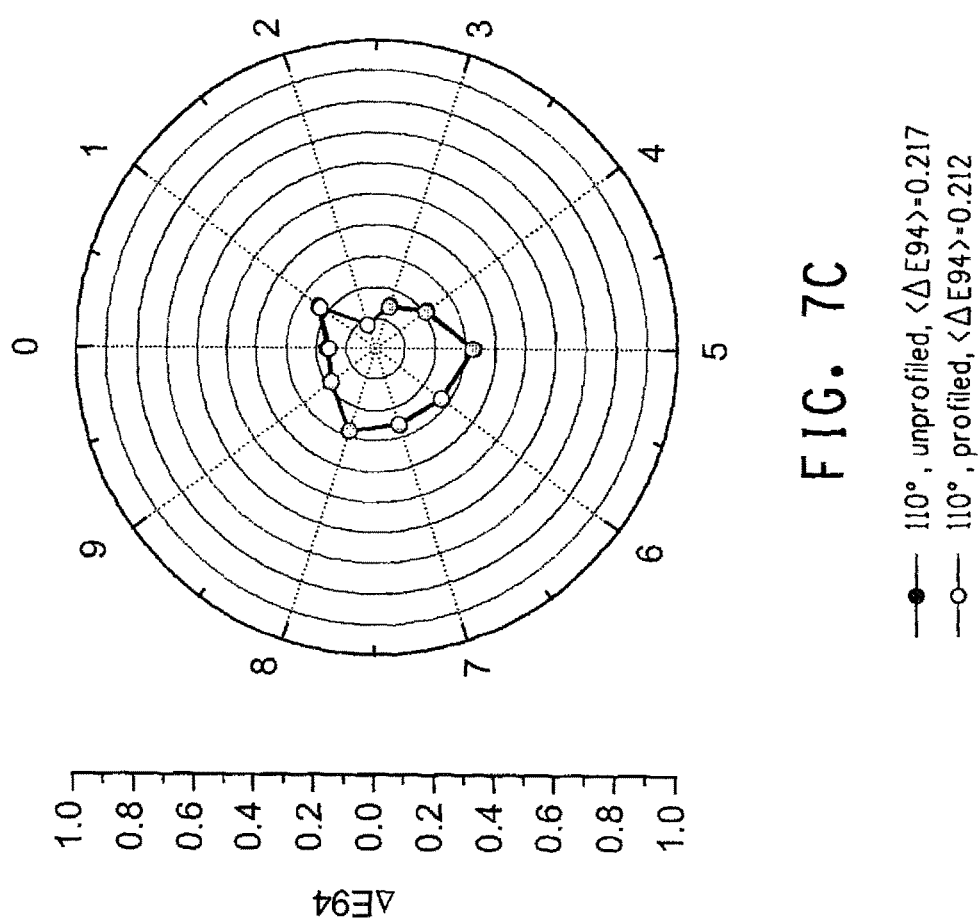
Figure 8F:
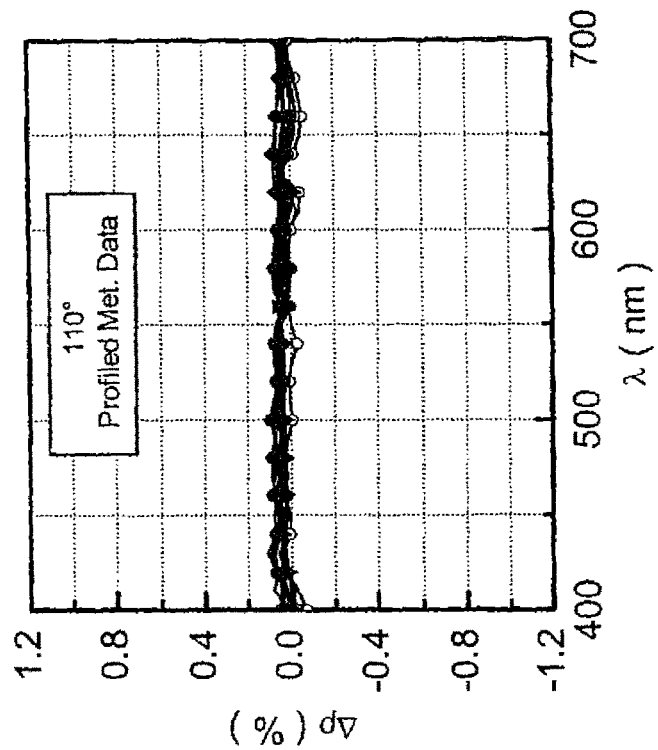

As can be seen from FIG. 7 the residual colour differences at the near-specular angle of 15° were reduced significantly after applying the geometry instrument profile (FIG. 7A), while the residual colour differences at the other two viewing angles (45°, 110° were not reduced significantly (FIGS. 7B and 7C). Calibrated colour data are shown in FIG. 8 (FIGS. 8B, 8D, and 8F).

What is claimed is:

1. A method for generating calibrated colour data of a target using colour measurement instruments distributed in the network, said method comprising the steps of:
   A) generating at least one standard instrument profile for the colour measurement instruments distributed in the network to correct photometric and wavelength scale differences, wherein step A) comprises:
      A1) measuring a set of solid reflectance standards at least two measurement geometry configurations and at each of the colour measurement instruments distributed in the network to obtain solid standard reflectance spectra of said solid reflectance standards, and
      A2) generating at least one standard instrument profile for each of the colour measurement instruments distributed in the network based on the solid standard reflectance spectra to correct photometric and wavelength scale differences, wherein the at least one standard instrument profile comprises a plurality of error parameters for correcting photometric and wavelength scale difference; and
   B) subsequent to generating the at least one standard instrument profile in of step A, generating at least one geometry instrument profile, that is different than the at least one standard instrument profile of step A, for the colour measurement instruments distributed in the network to correct geometry scale differences, wherein step B) comprises:
      B1) measuring a set of gonioapparent reflectance standards at at least two measurement geometry configurations and at each of the colour measurement instruments distributed in the network to obtain gonioapparent standard reflectance spectra,
      B2) correcting the gonioapparent standard reflectance spectra obtained in step B1 for photometric and wavelength scale errors by applying the at least one standard instrument profile generated in step A) to the gonioapparent standard reflectance spectra obtained in step B1) to obtain profiled gonioapparent standard reflectance spectra, wherein said correcting comprises using the plurality of error parameters of the at least one standard instrument profile to correct the gonioapparent standard reflectance spectra obtained in step B1), and
      B3) generating at least one geometry instrument profile for each of the colour measurement instruments distributed in the network to correct geometry scale differences based on said profiled gonioapparent standard reflectance spectra, wherein said generating at least one geometry instrument profile is performed by applying an error model, which is a function of both an angle of illumination and an angle of viewing, to the profiled gonioapparent standard reflectance spectra obtained in step B2).

2. The method of claim 1 further comprising the steps of:
   C) generating the calibrated colour data of the target, said step C) comprises:
      C1) obtaining target gonioapparent measurement data of the target using one or more of the colour measurement instruments distributed in the network;
      C2) applying the at least one standard instrument profile generated in step A) to the target gonioapparent measurement data to generate photometric and wavelength scale corrected target measurement data, and
      C3) applying the at least one geometry instrument profile generated in step B) to the photometric and wavelength scale corrected target measurement data obtained in step C2) to generate said calibrated colour data of the target.

3. The method of claim 1, wherein the colour measurement instruments comprise a goniospectrophotometer.

4. The method of any one of claims 1 to 3, wherein each of the colour measurement instruments distributed in the network is referenced to a master instrument.

5. The method of any one of claims 1 to 3, wherein each of the colour measurement instruments distributed in the network is referenced to a digital standard.

6. Use of the method of any one of claims 1 to 3 in paint production.

7. Use of the method of any one of claims 1 to 3 in colour development.

8. Use of the method of any one of claims 1 to 3 in automotive OEM coating.

9. The method of claim 2, wherein the colour measurement instruments comprise a goniospectrophotometer.

* * * * *